(12) United States Patent
Sauer et al.

(10) Patent No.: US 8,393,853 B2
(45) Date of Patent: Mar. 12, 2013

(54) HIGH EFFICIENCY TURBINE AND METHOD OF GENERATING POWER

(75) Inventors: Christopher R. Sauer, Tampa, FL (US); Patrick McGinnis, Jenkintown, PA (US); Igor Yatskar, Tarpon Springs, FL (US); Millard S. Firebaugh, Annapolis, MD (US)

(73) Assignee: Ocean Renewable Power Company, LLC, Portland, ME (US)

( * ) Notice: Subject to any disclaimer, the term of this patent is extended or adjusted under 35 U.S.C. 154(b) by 1139 days.

(21) Appl. No.: 11/985,971

(22) Filed: Nov. 19, 2007

(65) Prior Publication Data
US 2009/0129928 A1 May 21, 2009

(51) Int. Cl.
F03B 3/12 (2006.01)
(52) U.S. Cl. .......................................... 415/72; 416/176
(58) Field of Classification Search .................. 415/3.1, 415/906, 71, 72; 416/6, 176
See application file for complete search history.

(56) References Cited

U.S. PATENT DOCUMENTS

| | | |
|---|---|---|
| 958,599 A | 5/1910 | Cooksey |
| 1,835,018 A | 12/1931 | Darrieus |
| 1,987,065 A | 1/1935 | Karl |
| 2,106,928 A | 2/1938 | Lee |
| 3,986,787 A | 10/1976 | Moulton, Jr. et al. |
| 4,012,163 A | 3/1977 | Baumgartner |
| 4,084,918 A | 4/1978 | Pavlecka |
| 4,134,707 A | 1/1979 | Ewers |
| 4,237,384 A | 12/1980 | Kennon |
| 4,412,417 A | 11/1983 | Dementhon |
| 4,555,218 A | 11/1985 | Jonsson et al. |
| 5,405,246 A | 4/1995 | Goldberg |
| 5,451,137 A | 9/1995 | Gorlov |
| 5,451,138 A | 9/1995 | Istorik et al. |
| 5,499,904 A | 3/1996 | Wallace et al. |
| 5,577,882 A | 11/1996 | Istorik et al. |
| 5,642,984 A | 7/1997 | Gorlov |
| 5,720,597 A | 2/1998 | Wang et al. |

(Continued)

FOREIGN PATENT DOCUMENTS

| | | |
|---|---|---|
| DE | 2948060 | 6/1981 |
| EP | 1 335 130 B1 | 2/2003 |

(Continued)

OTHER PUBLICATIONS

JP 2000-265936 A Machine Translation. Accessed JPO website: Aug. 1, 2011.*

Primary Examiner — Richard Edgar
(74) Attorney, Agent, or Firm — Pierce Atwood LLP; Kevin M. Farrell; Katherine A. Wrobel

(57) ABSTRACT

A turbine includes a plurality of blades that rotate in a single direction when exposed to fluid flow, wherein the plurality of blades are joined to the central shaft by a plurality of radial spokes disposed substantially perpendicular to the central shaft such that the rotating plurality of blades causes the shaft to rotate. The plurality of blades has a uniform airfoil-shaped cross section, where the airfoil cross section presents a non-zero angle of attack to the current. The plurality of blades wind in a spiral trajectory, rotating around the central shaft and having a variable radius along the length of the central shaft such that a distance measured from the plurality of blades to the center shaft is greater near the center of the turbine than at either end.

37 Claims, 21 Drawing Sheets

U.S. PATENT DOCUMENTS

| | | | |
|---|---|---|---|
| 5,780,935 A * | 7/1998 | Kao | 415/3.1 |
| 6,036,433 A | 3/2000 | Skinner | |
| 6,036,443 A | 3/2000 | Gorlov | |
| 6,155,892 A | 12/2000 | Gorlov | |
| 6,253,700 B1 | 7/2001 | Gorlov | |
| 6,293,835 B2 * | 9/2001 | Gorlov | 440/8 |
| 7,132,760 B2 * | 11/2006 | Becker | 290/55 |
| 7,156,609 B2 | 1/2007 | Palley | |
| 7,257,946 B2 | 8/2007 | Welch, Jr. | |
| 7,362,004 B2 | 4/2008 | Becker | |
| 2004/0189010 A1 * | 9/2004 | Tharp | 290/54 |
| 2009/0022597 A1 | 1/2009 | Bowie | |

FOREIGN PATENT DOCUMENTS

| | | |
|---|---|---|
| GB | 2386161 A * | 9/2003 |
| JP | 63-57874 | 3/1963 |
| JP | 2000265936 A * | 9/2000 |
| SU | 1242637 | 7/1986 |
| WO | 0148374 A2 | 7/2001 |
| WO | WO 0148374 A2 * | 7/2001 |

* cited by examiner

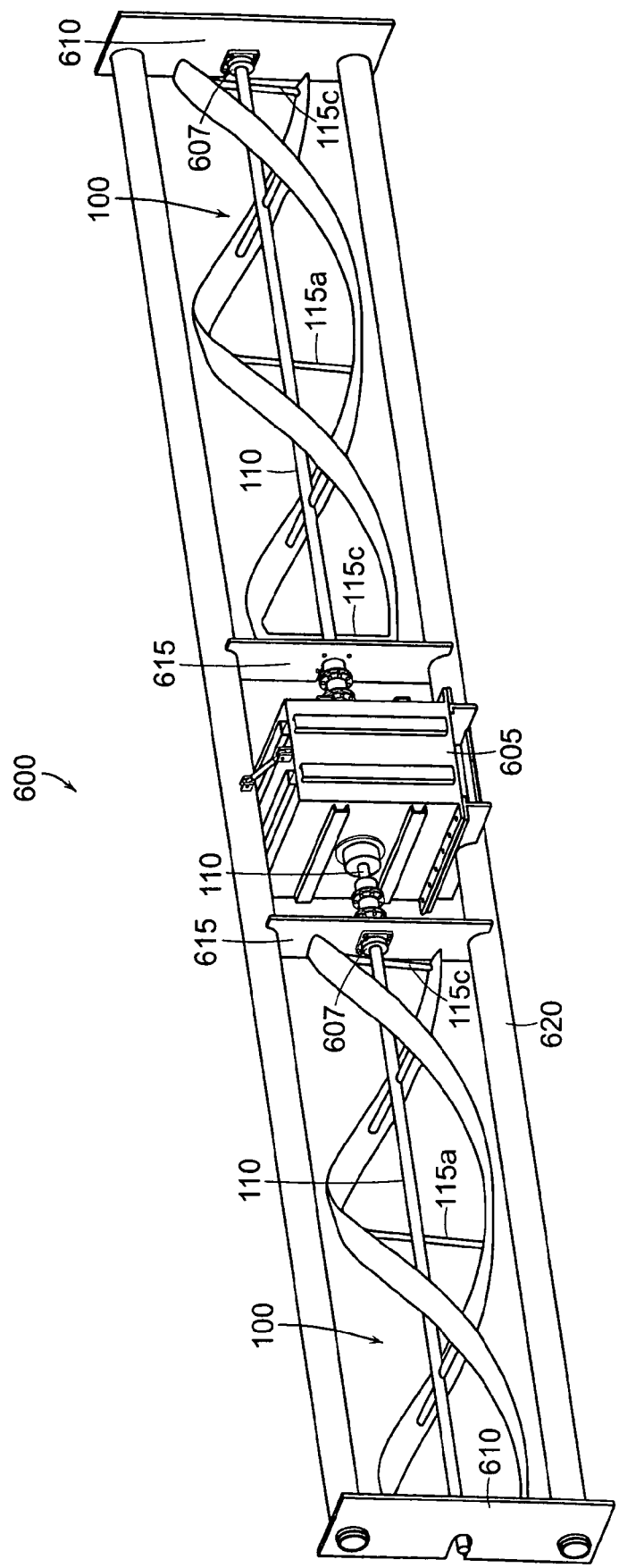

| | Present Invention | | GHT Compare | |
|---|---|---|---|---|
| Stream Velocity | 4 | m/s | | |
| RPM | 300 | Rev/Min | 4 | |
| RPS | 5 | Rev/Sec | 2.3333333333 | |
| Diameter | 0.75 | m | 1 | |
| | 29.52755906 | in | | |
| Blade Speed | 12.0165919 | m/s | 3.141592654 | |
| TSR | 3.004147975 | | 7.330382858 | |
| Density of Water | 1020 | kg/m^3 | 1.832595715 | |
| Area (per degree) | 0.0011684 | M^2 / degree | | |
| Area (per 5 Degree) | 0.005842 | M^2 / degree | | |
| Angular Velocity | 31.41592654 | rad/sec | 14.66076572 | |
| | | | | |
| Alpha | | | 0 degrees | |
| Chord Length | | | 5.52 <---Inch,-->m | 0.140208 |
| Chord in Horiz Plane | | | 7 <---Inch,-->m | 0.1778 |
| Height | | | 3 m | |
| Number of Blades | | | 2 | |
| Effective Height | | | 3 m | |
| Height per Degree | | | 0.008333 m | |
| Height per 5 Degree | | | 0.041667 m | |
| Area per Degree | | | 0.001168 m^2 | |
| Total Area 2 blades | | | 0.841248 m^2 | 0.54 Sigm |
| Barrel (5%) cross-section | | | 2.142857 m^2 | 2.23 Sigm |

Figure 15

| | GHT Compare | | Present Invention | |
|---|---|---|---|---|
| Stream Power | 69.94286 | kW | 69.94286 | |
| Efficiency | 0.3 | Efficiency-2 | 0.437373 | |
| Turbine Power | 20.98286 | kW | 30.59112 | |
| Angular Velocity | 14.66077 | rad/sec | 31.41593 | |
| Expected Torque | 1431.225 | N-m | 973.7454 | |
| RPM | 140 | | | |
| | | a | | 0.00115 |
| | | b | | 0.0735 |
| F=FL*sinD-FD*cosD | 0.392582 | c | | 0.03 |
| | 0.242152 | d | | 0.0089 |
| | 1429.059845 | | 1429.06 | 973.7454 |

Figure 16

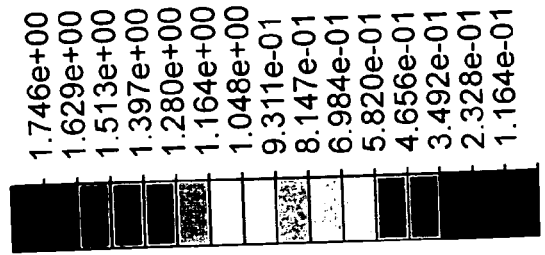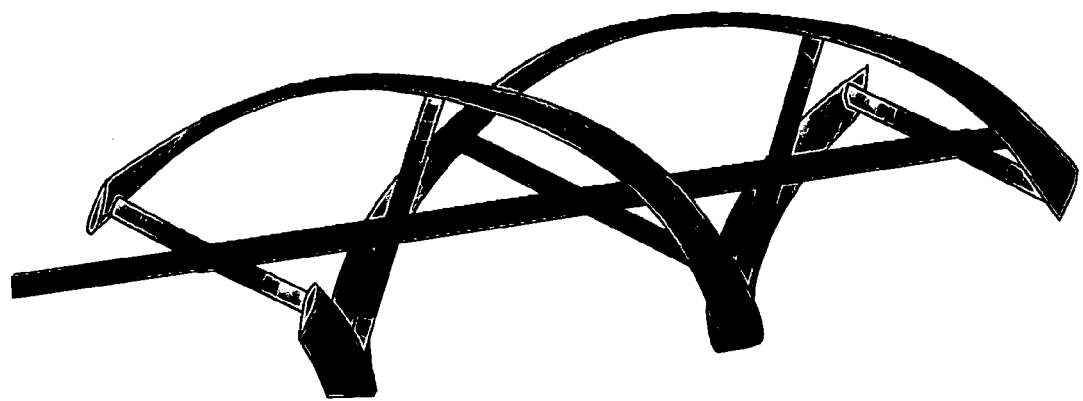
Figure 21

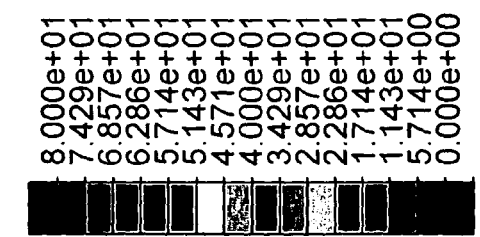
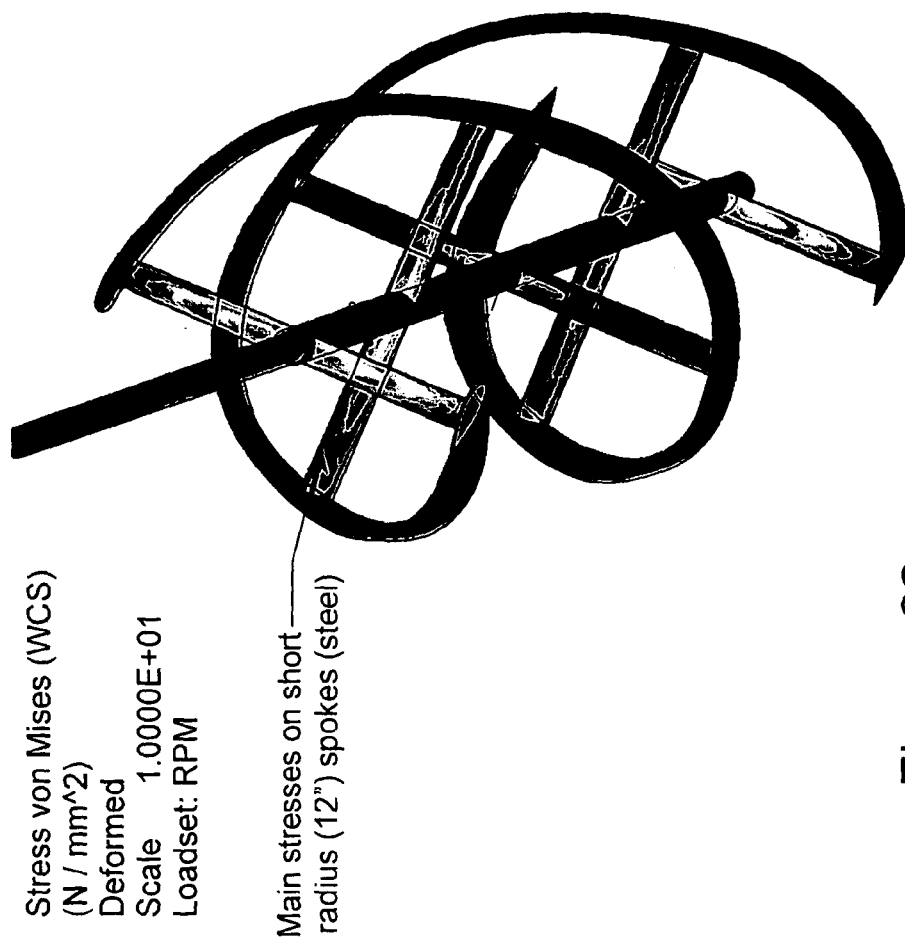
| Material | Yield strength (MPa) | Ultimate strength (MPa) |
|---|---|---|
| Structural steel ASTM A36 steel | 250 | 400 |
| Steel, API 5L X65 | 448 | 531 |
| Steel, high strength ASTM A514 | 690 | 760 |
Stress von Mises (WCS)
(N / mm^2)
Deformed
Scale   1.0000E+01
Loadset: RPM
Main stresses on short radius (12") spokes (steel)
Figure 22

HIGH EFFICIENCY TURBINE AND METHOD OF GENERATING POWER

BACKGROUND

1. Field of the Invention

The present invention relates generally to turbines and more specifically to a highly efficient unidirectional turbine that harnesses energy from a fluid flow to produce power.

2. Discussion of Background information

For many years turbines have been harnessing energy from fluid flow to produce power. Windmills, gyromills, delta turbines and cyclomills have long harnessed energy from wind and converted the same to power. Hydropower turbines harness ocean and tidal currents which are capable of providing a virtually inexhaustible supply of emission-free renewable energy. For example, the Darrieus turbine, a wind turbine, and the Gorlov Helical Turbine (GHT), a water turbine, each take a unique approach to harnessing energy in fluid flow to generate power.

The Darrieus wind turbine, a Vertical Axis Wind Turbine (VAWT), comprises vertical airfoils affixed in a symmetric arrangement to a vertical shaft. The vertical shaft connects to a gear box and generator for converting torque to power. Although effective for harnessing wind power from air flowing from any direction, this VAWT presents several disadvantages. First, the Darrieus turbine fails to self start and requires some initial force to begin rotating in a current. Second, the airfoils produce maximum torque at two points in their rotation cycle, the two points at which the airfoils are perpendicular to direction of airflow. The Darrieus turbine airfoils thus present a varying angle of attack in relation to current, and this leads to a sinusoidal fluctuation in resultant torque that creates a potentially destructive resonance at a natural frequency of the hydrofoil blades. The Darrieus turbine therefore requires some sort of braking mechanism for slowing rotation of the VAWT prior to destructive resonance. Lastly, the shaft of the Darrieus turbine couples with a generator requiring gearing multiplication and that gearing presents yet another potential mode of mechanical failure.

The GHT is a water based turbine based in principal on the Darrieus turbine in that airfoil shaped blades run along a center shaft and axis of rotation. The design of GHT, however, addresses some of the deficiencies of the Darrieus turbine. First, the hydrofoil blades of the GHT twist about the axis of rotation in a helical pattern such that the blades present a constant, optimal angle of attack within a current. This eliminates the resonance issue associated with the Darrieus turbine. Second, the GHT requires minimal gearing multiplication between the turbine and power generator. Despite these improvements, the GHT, however, presents some constraints. GHT efficiency is measured up to only about 35%. Also, because the helical configuration of blades sweeps a circumference of right cylinder, large centrifugal stresses develop. The GHT generally requires containment and constraint within a structure having an inflow and outflow channel preferably including inwardly extending, contoured sidewalls for guiding fluid flow and reducing turbulence.

Because ocean and tidal currents exist everywhere in the world and either flow constantly or at an extremely predictable rate of change, converting the energy in these currents to electricity could provide a predictable, reliable supply of electricity to electric power systems in many parts of the world. Approximately seventy percent (70%) of the population of the entire world lives within two hundred miles of an ocean, making that an accessible source of renewable energy. Accordingly, a need exists in the art for an easily produced, scalable, highly efficient turbine that produces high power output at low speeds and efficiently harnesses energy from a wide range of sites and water flow conditions including, tidal currents, open ocean currents, rivers, causeways, canals, dams and any other natural or manmade water flow.

SUMMARY OF THE INVENTION

The present invention solves the problems associated with existing hydropower turbines and provides a highly efficient, easily produced, scalable turbine that produces high power output at low speeds and efficiently harnesses energy from a wide range of sites and water flow conditions.

The present invention includes a turbine comprising a central shaft having a variable length and being adapted for engaging with a generator. The turbine further comprises a plurality of blades that rotate in a single direction when exposed to fluid flow, wherein the plurality of blades are joined to the central shaft by a plurality of radial spokes disposed substantially perpendicular to the central shaft such that the rotating plurality of blades causes the shaft to rotate. The plurality of blades have a uniform airfoil-shaped cross section, where the airfoil cross section presents a non-zero angle of attack to the current, which angle is defined by an intersection of the chord of the airfoil-shaped cross section and a tangential line abutting the same cross section and oriented in the direction of fluid flow. The plurality of blades wind in a spiral trajectory, rotating around the central shaft and having a variable radius along the length of the central shaft such that a distance measured from the plurality of blades to the center shaft is greater near the center of the length of the turbine than at either end. The rotating plurality of blades accordingly sweeps a circumference of a barrel-shaped cylinder. Additionally, in some embodiments, the plurality of blades traverses one or more 360 degree turns about the central shaft.

The present invention also comprises a method of generating power comprising providing a central shaft having a variable length and being adapted for engaging with a generator and providing a plurality of blades that rotate in a single direction when exposed to fluid flow, wherein the plurality of blades are joined to the central shaft by a plurality of radial spokes disposed substantially perpendicular to the central shaft such that the rotating plurality of blades causes the shaft to rotate. The plurality of blades further comprise an airfoil-shaped cross section having a non-zero angle of attack, which angle is defined by an intersection of the chord of the airfoil-shaped cross section and a tangential line abutting the same cross section and oriented in the direction of fluid flow. Additionally, the plurality of blades have a spiral wound trajectory rotating around the central shaft and having a variable radius along the length of the central shaft such that a distance measured from the plurality of blades to the center shaft is greater at the center of the turbine than at either end. The method further comprises providing a generator for engaging with the central shaft, attaching the generator and the plurality of blades to the central shaft to create a turbine generator unit assembly, and deploying the turbine generator unit within a fluid flow.

The present invention is described below in detail according to its preferred embodiments with reference to the following figures.

BRIEF DESCRIPTION OF THE DRAWINGS

These and other features, aspects, and advantages of the present invention will become better understood with reference to the following description, appended claims, and accompanying drawings where:

FIG. 4b depicts side view of the embodiment of FIG. 4a.

FIG. 4c depicts a close up side view of one section of the embodiment of FIG. 4a.

FIG. 6 shows a perspective view of a plurality of turbines according to one embodiment of the present invention coupled with a generator.

FIG. 10b depicts a perspective view of the turbine of FIG. 10a.

FIG. 10c depicts another perspective view of the turbine of FIG. 10a.

FIG. 15 depicts a table of representative values and calculations related to one embodiment of the turbine of the present invention.

FIG. 16 depicts a table of representative values and calculations related to one embodiment of the turbine of the present invention.

FIG. 21 depicts maximum simulated displacement for one embodiment of the turbine of the present invention.

FIG. 22 depicts maximum simulated stress values for one embodiment of the turbine of the present invention.

DETAILED DESCRIPTION

The present invention includes a turbine and method of making the same. The unique design of the present invention provides for a highly efficient, easily produced, scalable turbine that produces high power output at low fluid velocity and efficiently harnesses energy from a wide range of sites and water flow conditions. The method of making the turbine is a low cost, easily reproduced and scalable process. Various features and advantages of the present invention are described below with reference to several preferred embodiments and variations thereof. Those skilled in the art, however, will understand that alternative embodiments of the structures and methods illustrated herein may be employed without departing from the scope and principles of the described invention.

Figure 1:
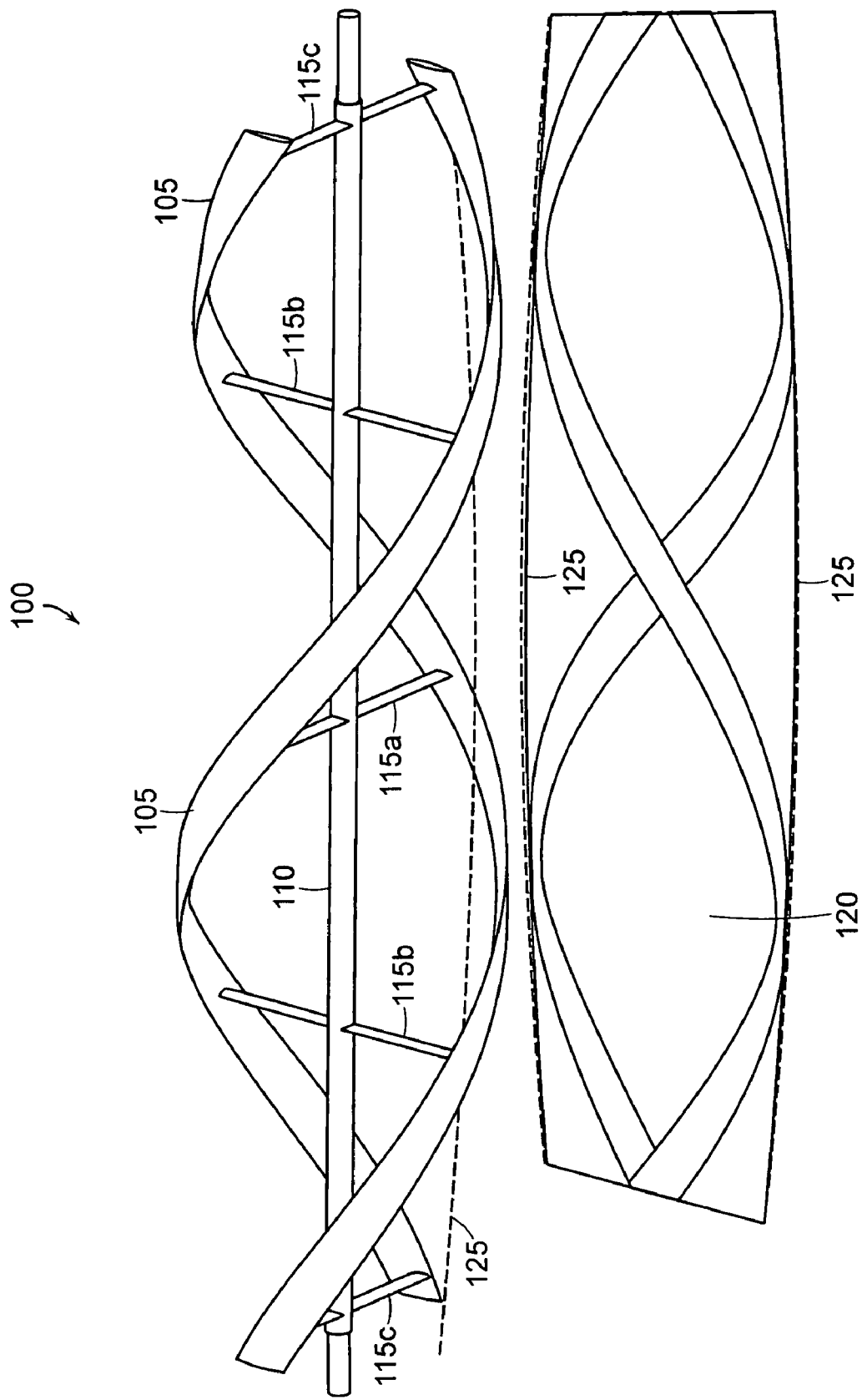
FIG. 1 depicts a perspective view of one embodiment of the turbine of the present invention.

As shown in FIG. 1, an exemplary embodiment of the highly efficient turbine 100 of the present invention comprises a plurality of blades 105 tracing a spiral wound path about a central shaft 110. Here, the turbine 100 comprises two blades 105 symmetrically disposed about the central shaft 110 and intertwined such that an inner surface of each blade 105 faces a corresponding inner surface of the other blade at a same point along the lengths of both blades 105. The plurality of blades 105 join to the central shaft 110 via a plurality of radial spokes 115 such that the rotating plurality of blades 105 cause the central shaft 110 to rotate. The plurality of lightweight, strong radial spokes 115 may join to the corresponding plurality of blades 105 via any fastening means capable of rigidly joining components and remaining fastened under continuous load conditions. Such means may include, but are not limited to, mechanical fasteners such as rivets, nuts and blots, screws and threaded guide dowels. Joining the plurality of blades 105 to the central shaft 110 with a plurality of lightweight radial spokes 115 eliminates a need for traditional heavy spokes and/or end disks that decrease efficiency and generate end-turbine losses.

As shown in the embodiment of the turbine 100 of FIG. 1, the radial spokes 115 are substantially perpendicular to the central shaft 110 and connect the plurality of blades 105 to the central shaft 110 at one or more locations along the length of the central shaft 110. Here, the radial spokes 115 are symmetrically spaced along the central shaft 110 such that a plurality of central primary radial spokes 115a connect the plurality of blades 105 to the central shaft 110 at a center point. A plurality of secondary radial spokes 115b connect the plurality of blades 105 to the central shaft 110 at points equidistant from the plurality of primary radial spokes 115a. A plurality of tertiary radial spokes 115c join the plurality of blades 105 to the central shaft 110 at points equidistant from the secondary radial spokes 115b and located further from the primary radial spokes 115a than from the plurality of secondary radial spokes 115b.

In one embodiment, the radial spokes 115a, 115b, 115c are symmetrically spaced along the central shaft 110 in pairs such that one or more of the plurality of blades 105 connect to the central shaft at the same point. In another embodiment, these pairs of radial spokes 115 each may be a single still rod extending from one of the plurality of blades 105 to another of the plurality of blades 105 and crossing the central shaft 110. One skilled in the art will recognize that the radial spokes 115a, 115b, 115c may be asymmetrically spaced along the central shaft and staggered such that each of the plurality of blades 105 connects to the central shaft 110 at one or more unique connection points. Additionally, the turbine 100 of the present invention may employ any number of radial spokes 115 such that the plurality of blades 105 connects securely to the central shaft 110 in a desired configuration. As shown by way of example in FIG. 1, primary radial spokes 115a are longer than secondary radial spokes 115b, which are longer than tertiary radial spokes 115c. This variation in length creates a barrel shaped turbine. FIG. 1 includes a two dimensional mirror image projection 120 of the turbine 120, and a series of broken lines 125 highlight the barrel shaped cylinder that the plurality of blades 105 will sweep as they rotate. Varying a length of one or more of the plurality of radial spokes 115 will result in variations in the barrel shape swept by the plurality of blades 105.

Figure 2:
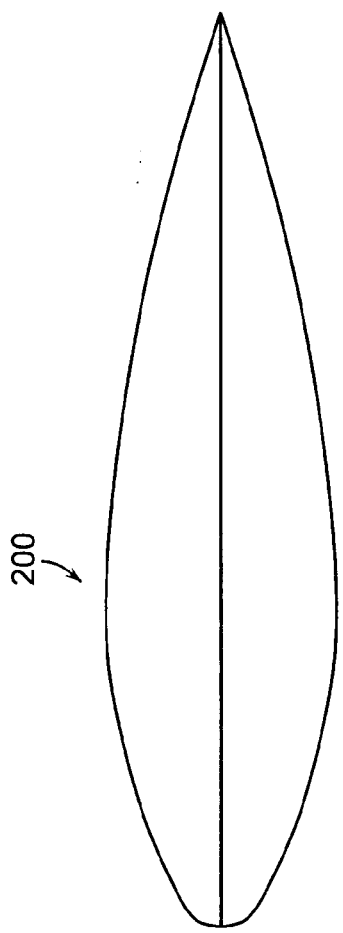
FIG. 2 depicts a cross section of one embodiment of the turbine of the present invention.
Figure 3:
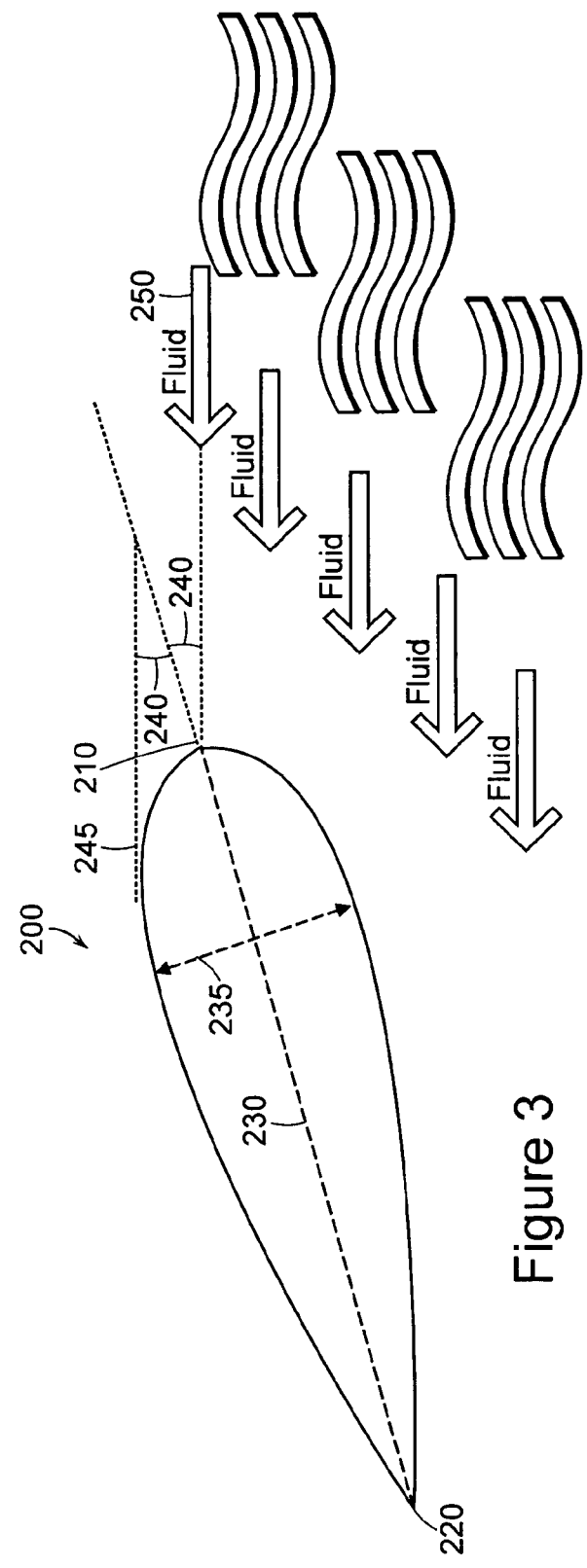
FIG. 3 depicts the cross section of FIG. 2 disposed in a fluid flow.

Turning now to FIGS. 2 and 3, the plurality of blades 105 have an airfoil, or hydrofoil, shaped cross-section 200 having a leading edge 210, a trailing edge 220 and a centerline chord 230. In one embodiment of the present invention, the hydrofoil cross-section 200 comprises an aerodynamic aspect ratio, for example, NACA 0018 or NACA 0020. This configuration maximizes the speed of rotation of the turbine 100 and enables the plurality of blades 105 to have a solid configuration that withstands centrifugal and fluid flow forces. The hydrofoil cross-section 200 may be symmetrical about the centerline chord 230, but preferably is asymmetrical. An asymmetrical design helps generate maximum torque and thereby contributes to achieving maximum efficiency.

The hydrofoil cross-section 200 also presents a non-zero angle of attack 240 for generating lift and maximizing generated torque. The angle of attack 240 is an angle defined by an intersection of the centerline chord 230 and a tangential line 245 abutting the hydrofoil cross-section 200 and oriented in the direction of fluid flow 250. In one embodiment of the present invention, the angle of attack 240 varies along the length of each of the plurality of blades 105. In addition to the hydrofoil-cross section 200 of the plurality of blades 105 helping to maximize generated torque, the plurality of radial spokes 115 also may contribute to that end result. In one embodiment, the plurality of radial spokes 115 also comprises a hydrofoil shaped cross-section 200 and the leading edge 210 of each cross-section 200 points in the direction of rotation of the turbine 100. The leading edge 210 of the plurality of radial spokes 115 is oriented in the same direction as the leading edge 210 of the plurality of blades 105 and that further contributes to the efficiency of the aerodynamic design of the turbine 100.

FIGS. 4a through 5b provide additional views of the embodiment of the present invention shown in FIG. 1. One skilled in the art will recognize that all of the included dimensions are scalable and provide merely one example of an embodiment of the present invention. Here, an embodiment of the turbine 100 comprises a plurality of blades 105 spiral wound about a central shaft 110. The plurality of blades 105 assume a shape equivalent to a curve traced on a barrel by rotation of a point crossing the barrel's circular right cross-sections at a changing oblique angle. The plurality of blades 105 thus presents a spiral wound trajectory having a variable radius along the length of the central shaft 100. Both FIG. 5a, an end view of this embodiment of the present invention, and FIG. 5b, a perspective end view of this embodiment of the present invention, clearly depict this spiral wound trajectory of the plurality of blades 105 that sweep a circumference of a barrel shaped cylinder when rotating.

Figure 4B:
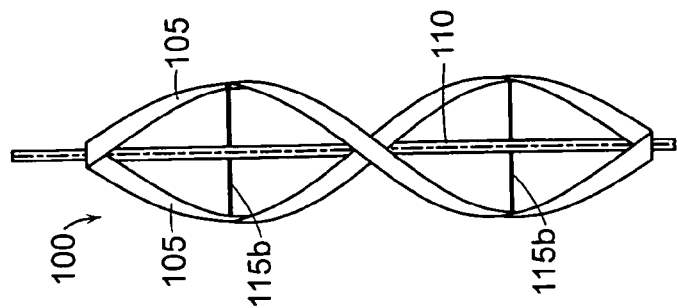
Figure 4C:
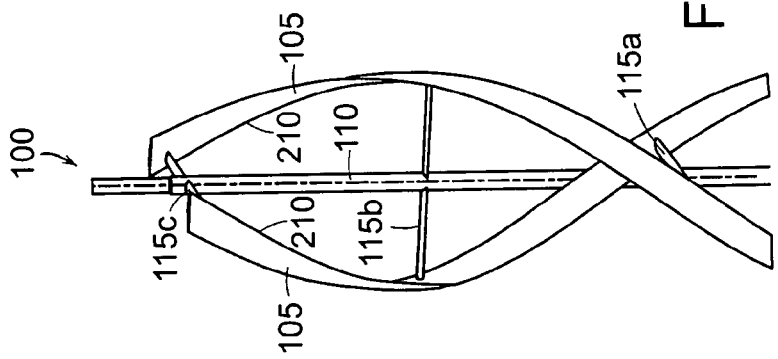
Figure 4A:
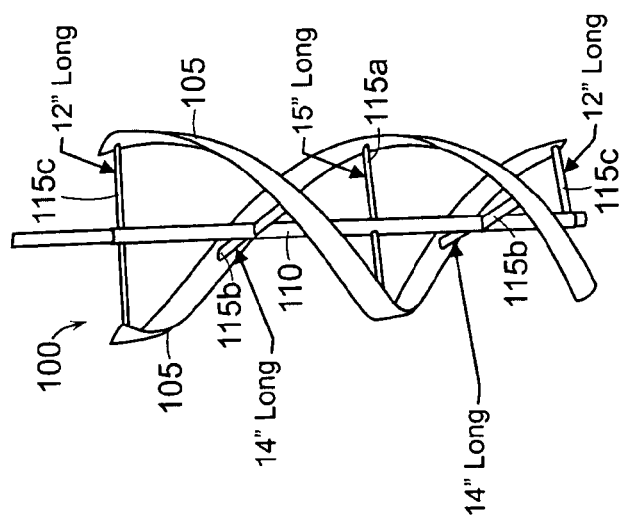
FIG. 4a depicts a perspective view of one embodiment of the turbine of the present invention.
Figure 5B:
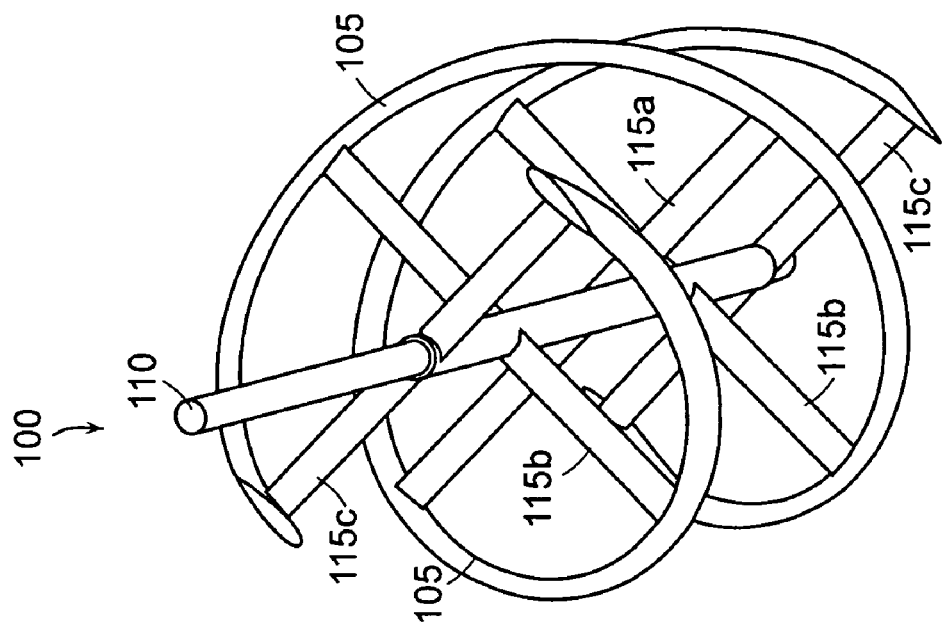
FIG. 5b depicts a perspective end view of one embodiment of the turbine of the present invention.
Figure 5A:
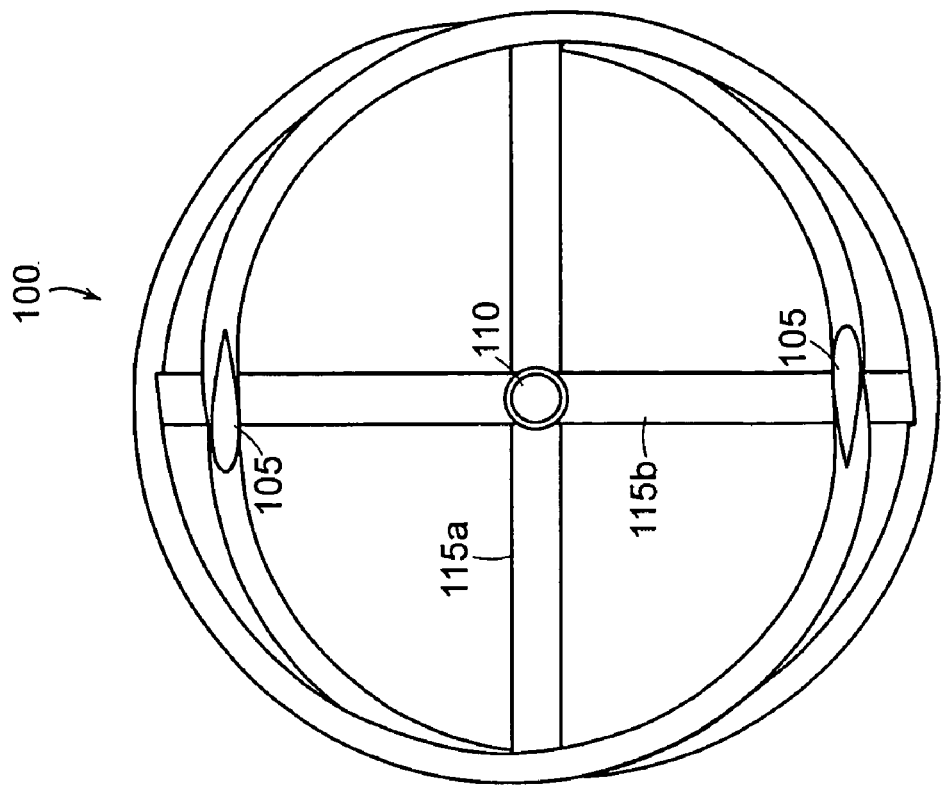
FIG. 5a depicts a top view of one embodiment of the turbine of the present invention.

In the embodiment of FIGS. 4a through 4c, the turbine 100 assumes a barrel shape held by a plurality of radial spokes 115, where a plurality of primary spokes 115a positioned approximately at the center of the turbine 100 are shown having a fifteen (15) inch length. A plurality of secondary spokes 115b positioned on either side of the plurality of primary spokes 115a are shown having a length of fourteen (14) inches and a plurality of tertiary spokes 115c located near either end of the turbine 100 have a length of twelve (12) inches. This gradual decrease in the length of the plurality of radial spokes 115, as measured from the plurality of primary spokes 115a outward to the plurality of tertiary spokes 115c, combined with the shown decrease in distance along the central shaft 110 between the plurality of spokes ensures that the plurality of blades 105 affixes to the central shaft 110 at a variable radius and lies along the walls of circular barrel shape. The unique trajectory of the plurality of blades 105 (spiral wound and barrel bowed) increases blade strength and reduces stresses and stains under load conditions. This unique barrel shape also helps ensure that the turbine 100 of the present invention operates at least at a 43 percent (43%) efficiency, as compared to right cylinder turbines having efficiency of only up to about thirty-five percent (35%).

In addition to a barrel shape, other characteristics add to the efficiency of the turbine 100 of the present invention. For example, in one embodiment, the plurality of blades 105, in addition to spiraling around the central shaft at a varying radius, traverses one or more 360 degree turns about the central shaft 100. As shown best in the embodiment of turbine 100 depicted in FIGS. 4a, 4b and 5b, each blade 105 traverses a full 360 degree turn about the central shaft 110, and the two blades 105 shown in this embodiment thus provide two full 360 degree turns. The plurality of blades 105 always presents at least one point, and more preferably at least two points, having an optimal non-zero angle of attack 140 relative to the direction of fluid flow 150. This variable angle of attack 150 compensates for the slower peripheral speed at a central radius along the length of the turbine 100. This configuration of one or more blades each rotating about a central shaft 110 in at least one full 360 degree turn and at a varying angle of attack 140 thus reduces potential for turbulence and adds to the efficiency of the turbine 100.

The varying, non-zero angle of attack 150 also ensures that the pressure differential around the hydrofoil cross section 200 of the turbine 100 self starts the turbine 100 upon deployment in a fluid flow. Additionally, the turbine 100 of the present invention, like other turbines operating under a lift force principle rather than a drag force principle, rotates in one direction only regardless of the direction of fluid flow 150. The aerodynamic blades of the turbine 100 of the present invention thus are capable of efficiently harnessing energy from a fluid flow 150 approaching the turbine 100 from any direction.

Figure 7:
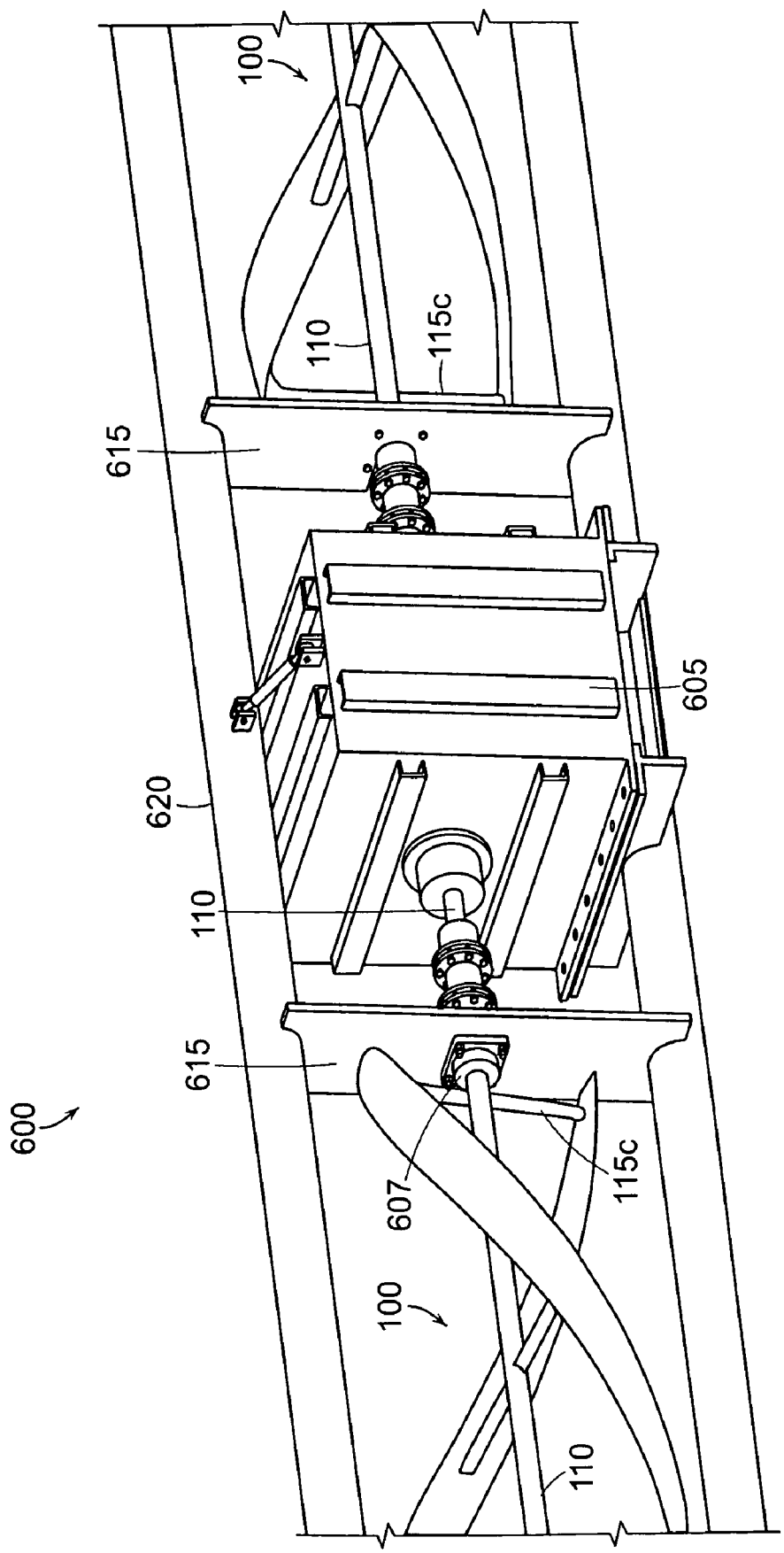
FIG. 7 depicts an enlarged portion of the perspective view of FIG. 6.
Figure 8:
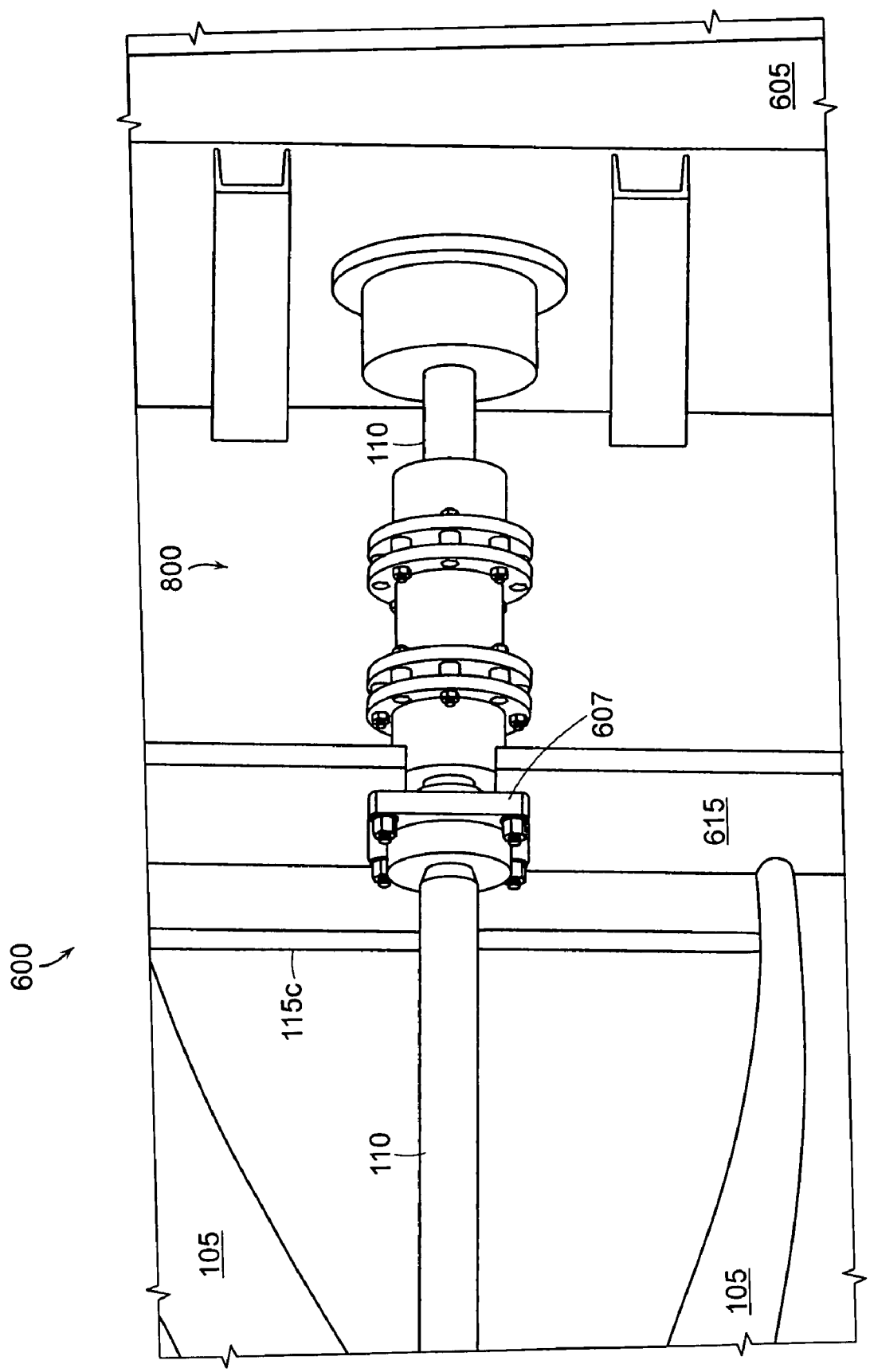
FIG. 8 depicts an enlarged portion of the perspective view of FIG. 7.
Figure 9:
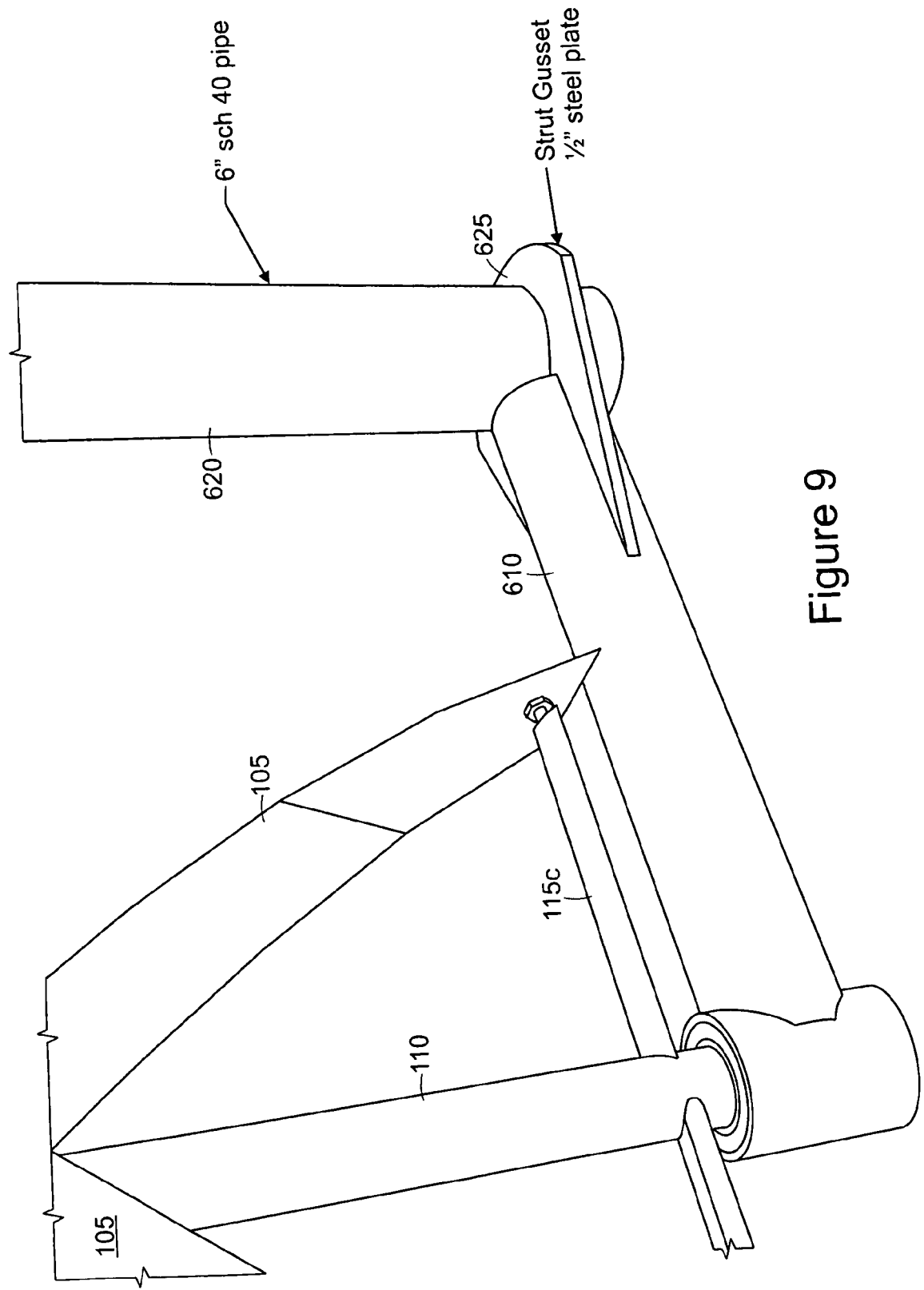
FIG. 9 depicts a perspective partial view one embodiment of the turbine of the present invention.

FIGS. 6 through 8 depict one embodiment of the turbine 100 of the present invention installed in a turbine generator unit (TGU) 600. The central shaft 110 is manufactured from any sturdy material capable of withstanding operational forces. For example, the central shaft may be a two inch (2") diameter, schedule 80 steel pipe that has a variable length for accommodating one or more turbines 100 and/or accommodating variation in the trajectory of the plurality of blades 105 in a single turbine 100.

As shown in FIGS. 6 through 8, one or more turbines 100 each mount to a single central shaft 110 with a submersible permanent magnet generator 605 disposed therebetween such that the generator 605 requires no gearing multiplication. The plurality of turbines 100 rotate within a fluid flow 150 and the plurality of turbines 100 convert energy therein to mechanical energy that transfers directly through the rotating central shaft 110 to the submersible permanent magnet generator 605.

A plurality of bearings 607 housed within end bearing carriers 610 and center bearing carriers 615 supports the central shaft 110 and a minimal external structure 620 provides a basic frame for joining end bearing carriers 610 and center bearing carriers 615. The external structure 620 may comprise any suitable material capable of withstanding operational forces, such as six inch (6") schedule 40 steel pipe. Additional support may exist between the external structure 620 and bearing carriers 610, 615 such as but not limited to one or more half inch (½") thick steel plate strut gussets 625. As shown in FIG. 8, the central bearing carriers 615 in one embodiment also support a shaft extension system 800 that joins the generator 605 to the central shaft and enables easy installation and removal of the generator 605 without requiring disassembly of the entire TGU 600. The minimal external structure 620 surrounding the plurality of turbines 100 and generator 605 of the TGU 600 presents minimal resistance to fluid flow and thereby also contributes to the high efficiency and maximum output of the turbine 100 of the present invention.

The generator 605 converts the mechanical energy (i.e., RPM and torque) into electricity. In one embodiment, a power electronics system (not shown) controls, conditions and synchronizes the generated electricity. The synchronized electricity then arrives at on-shore substations via one or more underwater transmission cables (not shown). As an alternative to sending the electric energy to shore, in yet another embodiment, the electrical generation systems (not shown) could power production of hydrogen and/or potable water at an off-shore site that could ship the hydrogen and/or potable water to any receiving terminal around the world.

Figure 10B:
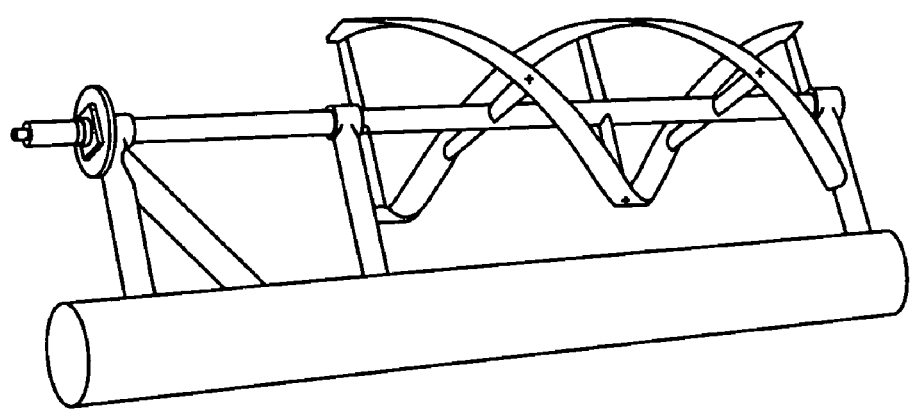
Figure 10A:
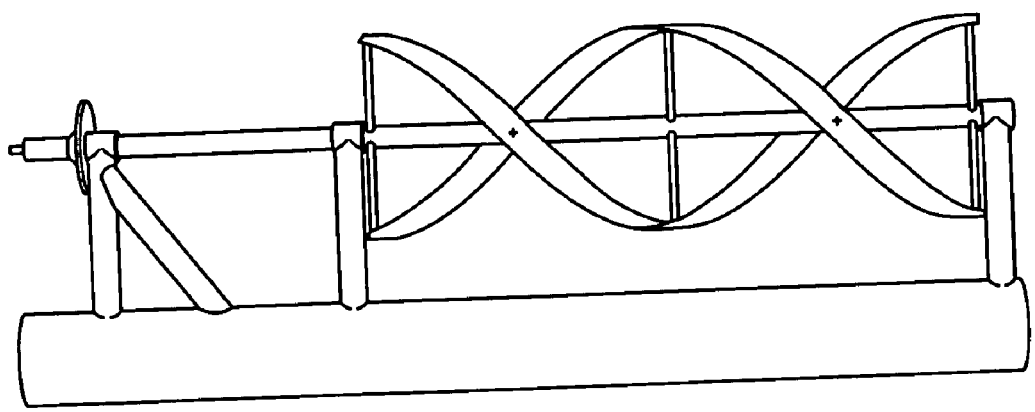
FIG. 10a depicts a side view of another embodiment of the turbine of the present invention.
Figure 10C:
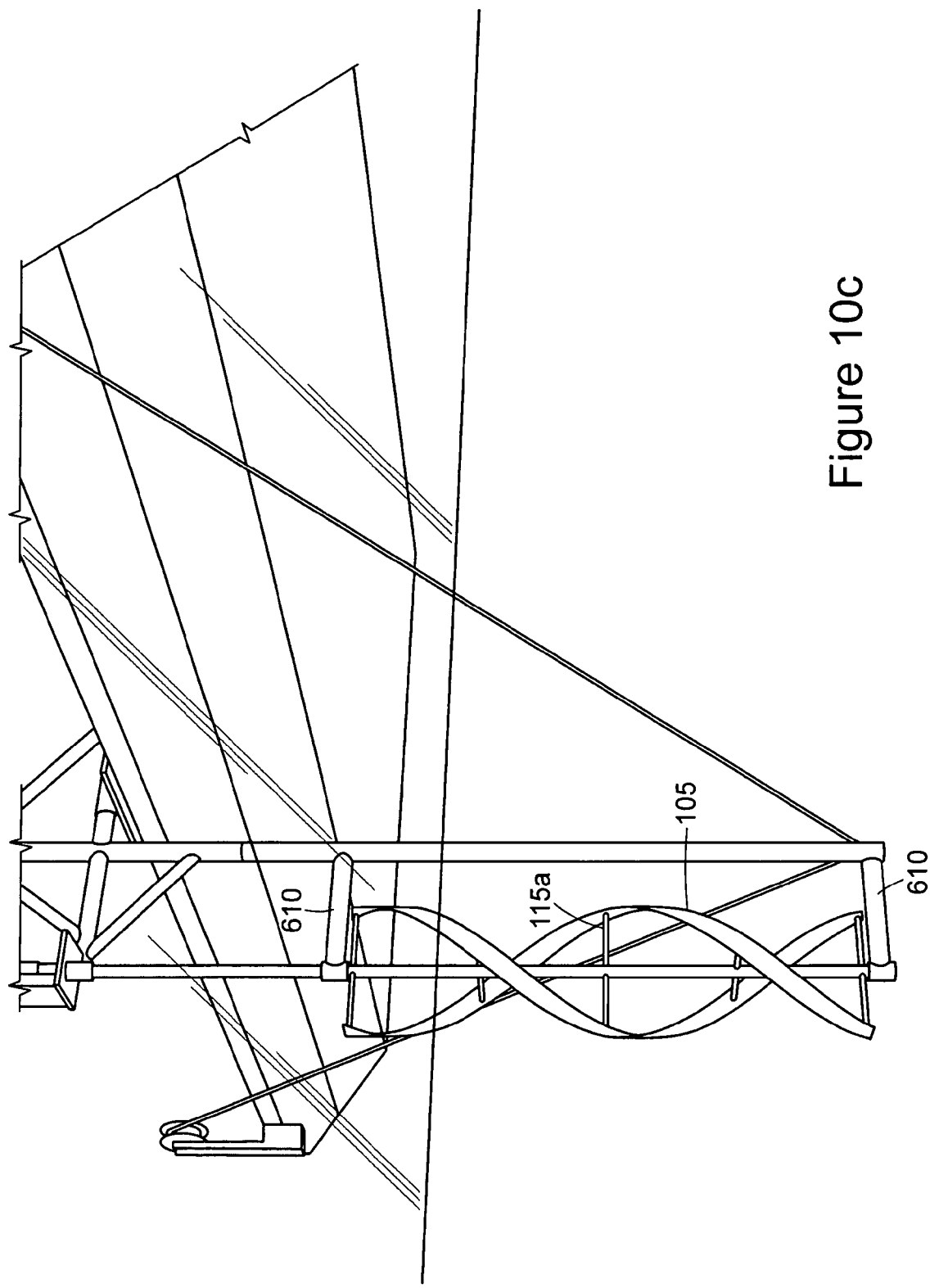

The submersible TGU 600 is positionable at optimal locations within current flow to most fully and efficiently utilize fluid flow energy and avoid interfering with commercial shipping and any other water surface activity. The horizontal configuration of the TGU 600 shown in FIGS. 6 through 8 maximizes extraction efficiency because the velocity of currents generally varies by depth; Very little variation usually occurs in the horizontal plane. Additionally, as shown in FIGS. 10a through 10c, the submersible turbine generator units 400 are adaptable for deployment in a vertical configuration. Such deployment is preferable in waterways having generally vertically uniform flow velocities which also may be largely unidirectional.

Submersible turbine-generator units 600 according to embodiments of the present invention mount individually on a mounting platform, such as the barge shown in FIG. 10c, or several of them may mount ("stack") on a fully submersible platform structure (not shown). The platforms may anchor to the bottom of a waterway using a mooring system comprising mooring lines and anchors. Alternatively, TGUs 600 deployed in shallow waters may mount directly to pilings or other appropriate existing foundation structures, such as, for example, existing oil drilling platforms or piers.

Figure 11:
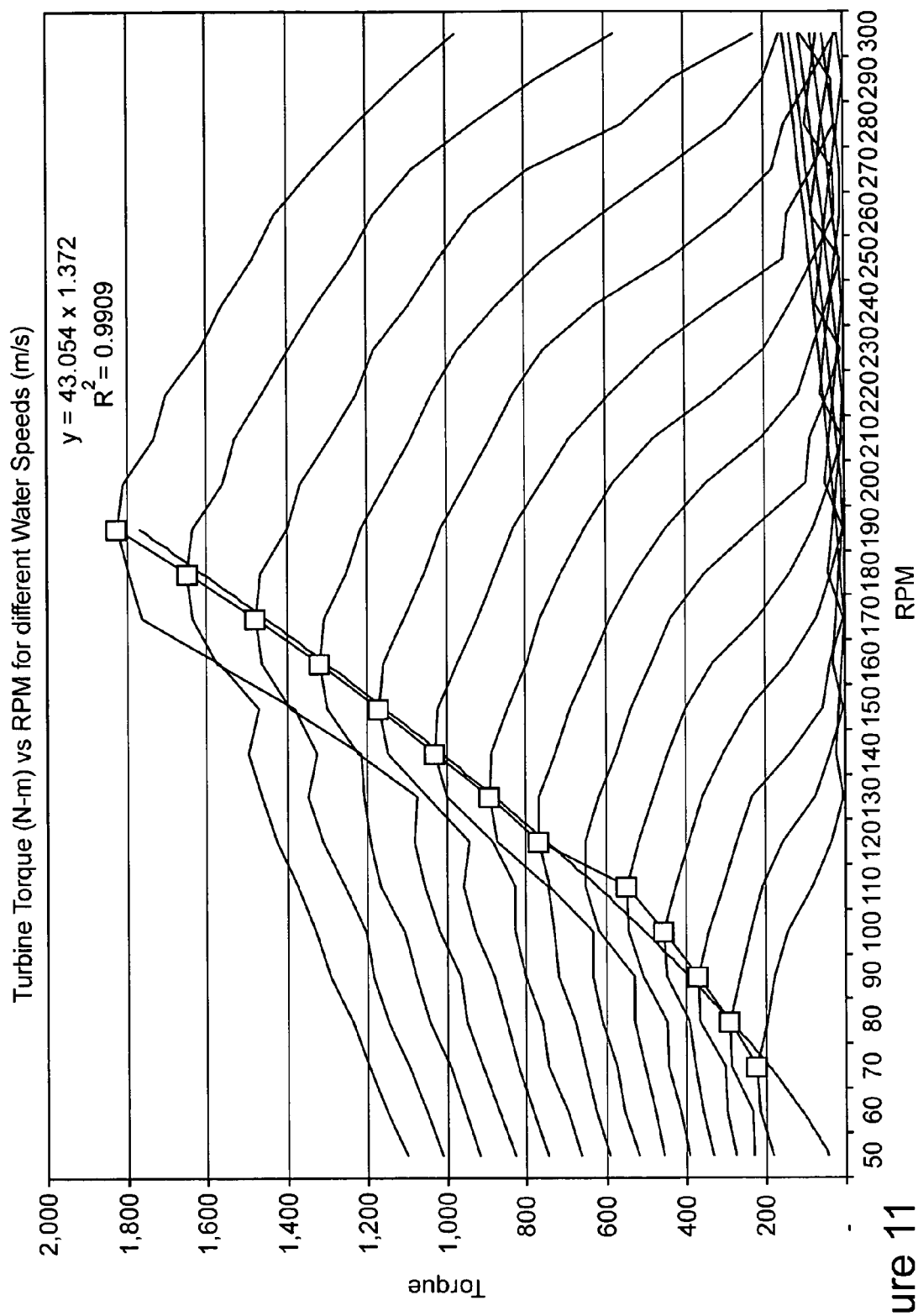
FIG. 11 depicts representative torque measurements for one embodiment of the turbine of the present invention rotating at various speeds under various fluid flow velocities.
Figure 12:
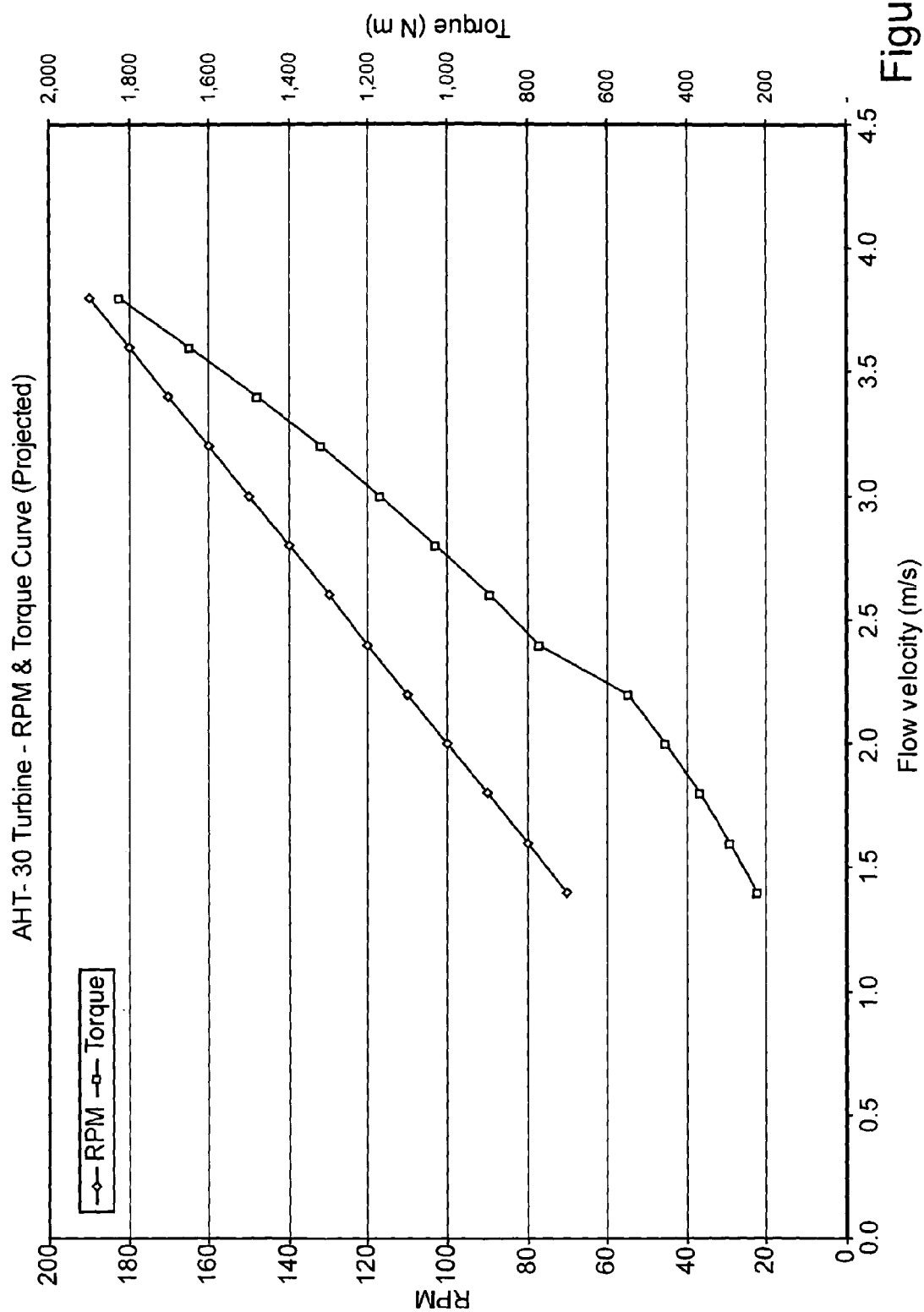
FIG. 12 depicts the torque and RPM measurements of FIG. 11 at various fluid flow velocities.
Figure 13:
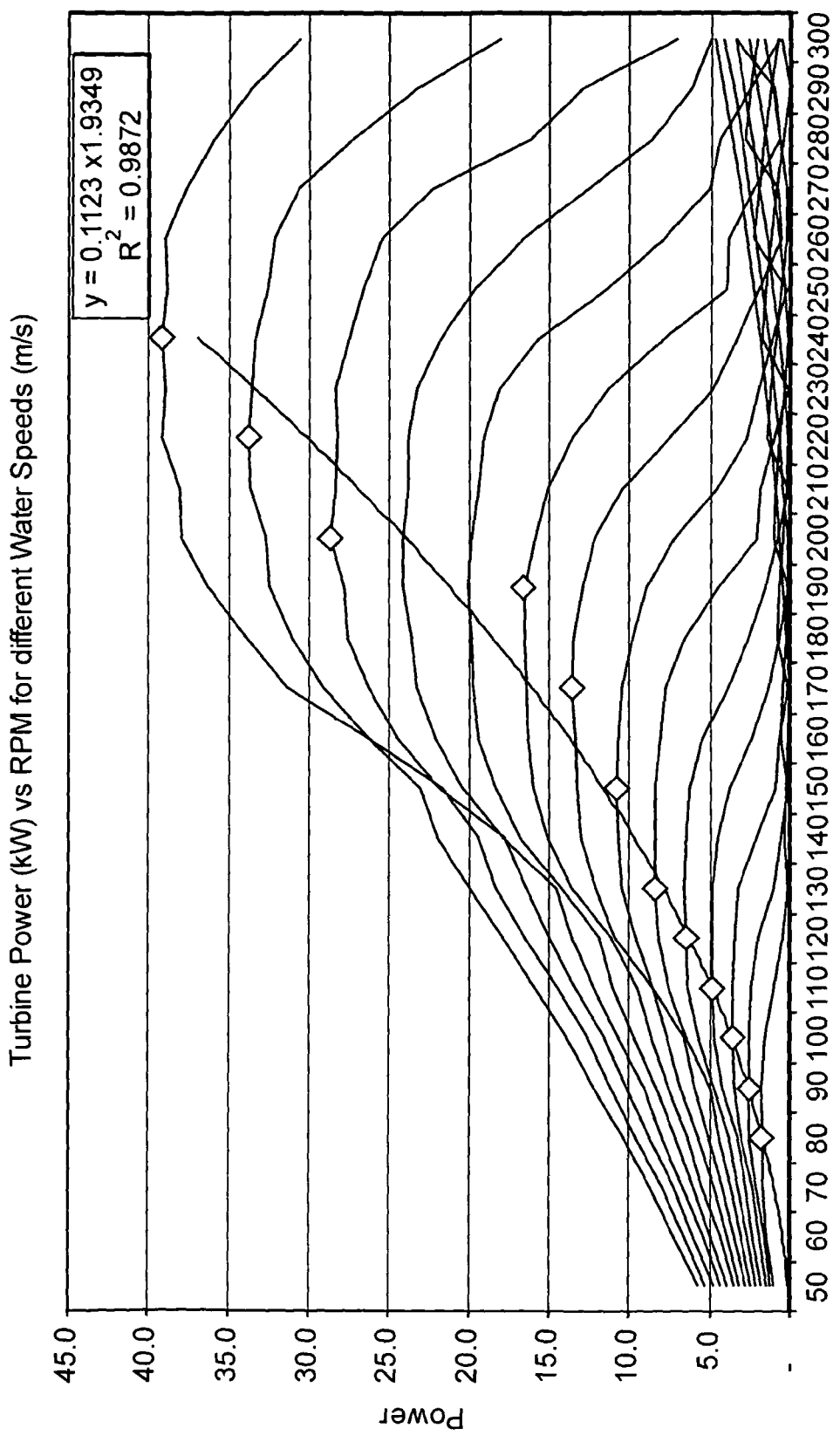
FIG. 13 depicts representative power measurements for one embodiment of the turbine of the present invention rotating at various speeds at various fluid flow velocities.

Turning now to actual measured parameters associated with the present invention, FIGS. 11 through 13 present torque and power measurements for one embodiment of the turbine 100 of the present invention that is of a one-third (⅓) scale as depicted in FIGS. 4a through 4c. Scale refers here to physical linear dimensions of the turbine 100 of the present invention. A full scale turbine 100 would be three times larger than the experimental one-third (⅓) scale version and would have a centerline chord 230 three times longer than that of the ⅓ scale version. Additionally, power output is proportional to the square of the scale size of the turbine 100.

Returning now to FIGS. 11 and 12 showing calculated torque at various fluid velocities and plotted against turbine revolutions per minute (RPM), an optimal torque value occurs at an identifiable turbine RPM at each fluid velocity. Under all fluid velocities, torque for the ⅓ scale turbine 100 peaks between approximately 250 N-m and 1850 N-m within a range of fluid speeds extending from approximately 1.4 m/s and to approximately 4.0 m/s. Under these same conditions turbine RPM at optimal torque conditions extends from approximately 50 rpm to approximately 190 RPM.

FIG. 13 depicts predicted power in kilowatts (kW) at various fluid velocities and plotted against turbine revolutions per minute (RPM). An optimal power output occurs at an identifiable turbine RPM at each fluid velocity. Under all fluid velocities, power for the ⅓ scale turbine 100 peaks between approximately 2.5 kW and 40 kW within a range of fluid speeds extending from approximately 1.4 m/s and to approximately 4.0 m/s. Under these same conditions turbine RPM at optimal power output levels extends from approximately 80 rpm to approximately 240 RPM.

Figure 14:
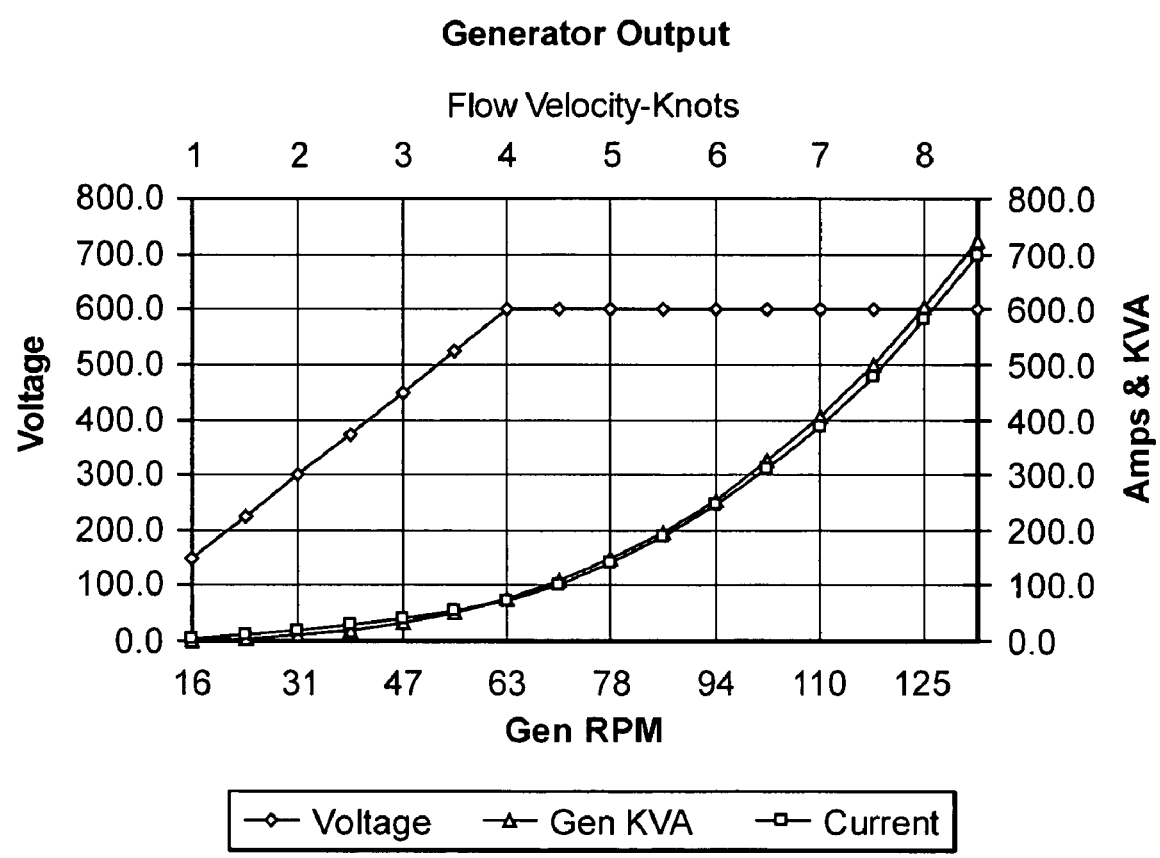
FIG. 14 depicts generator output measurements for a generator coupled with one embodiment of the turbine of the present invention.
Figure 17:
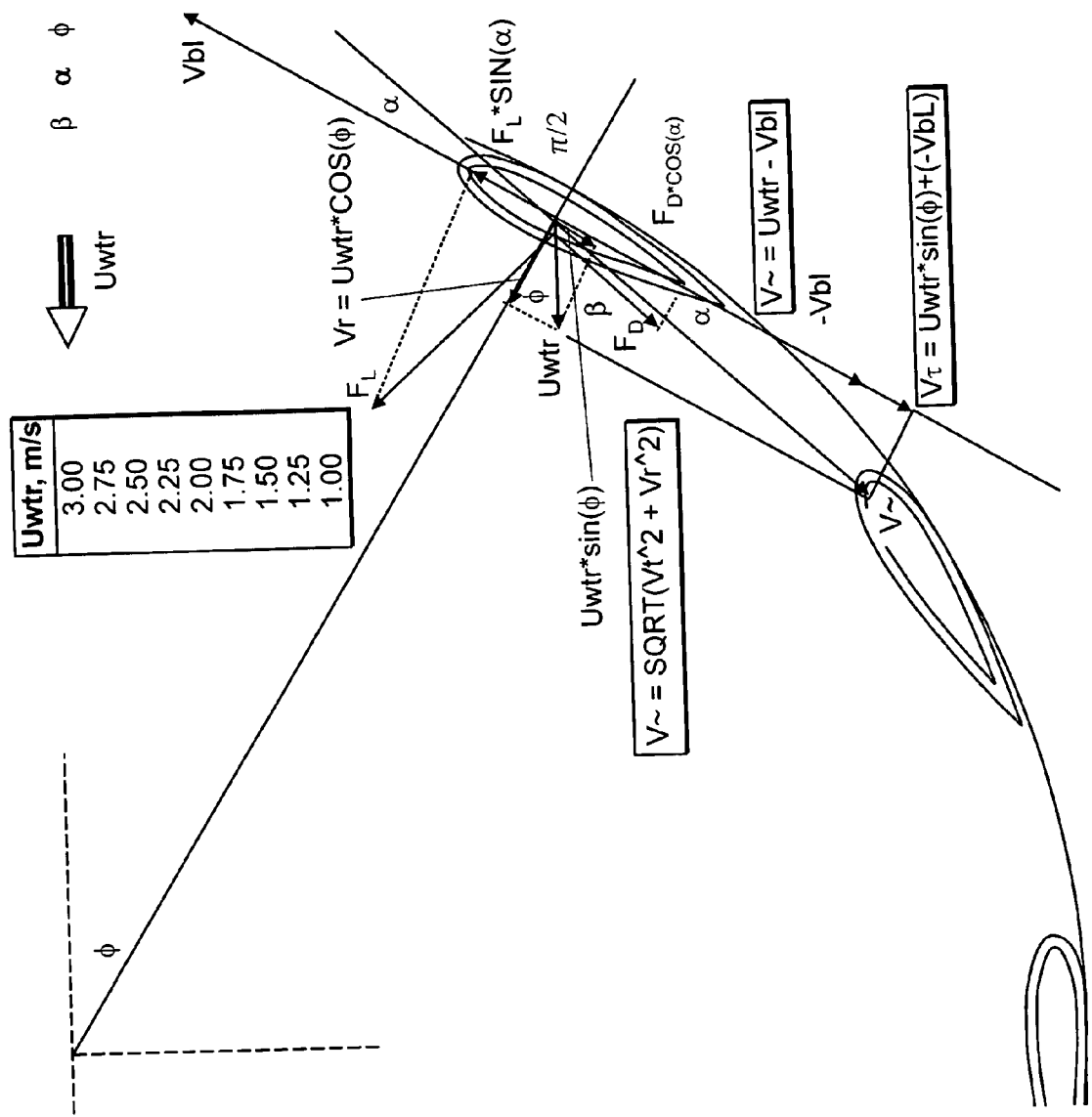
FIG. 17 depicts a diagram of a cross section of one embodiment of the turbine of the present invention and corresponding equations demonstrating derivations of the calculated values of FIGS. 15 and 16.

Considering the torque calculations of FIGS. 11 and 12 in connection with the calculated power output of FIG. 13, an optimum power output and torque are identifiable for each particular fluid velocity for this ⅓ scale turbine 100 embodiment of the present invention. For a fluid flow of approximately 3 m/s, maximum calculated torque is approximately 1200 N-m at 140 turbine RPM and power under these conditions falls between 15 kw and 20 kw and more particular falls around 16.6 kW. Two ⅓ scale turbines 100 of the present invention rotating on a single shaft therefore output greater than 30 kW, which is twice the measured power output of a single, similarly sized GHT. FIG. 14 provides predicted data related to a output parameters of one design of a permanent magnet generator employed in conjunction with the ⅓ scale turbine 100 embodiment of the present invention.

Figure 18:
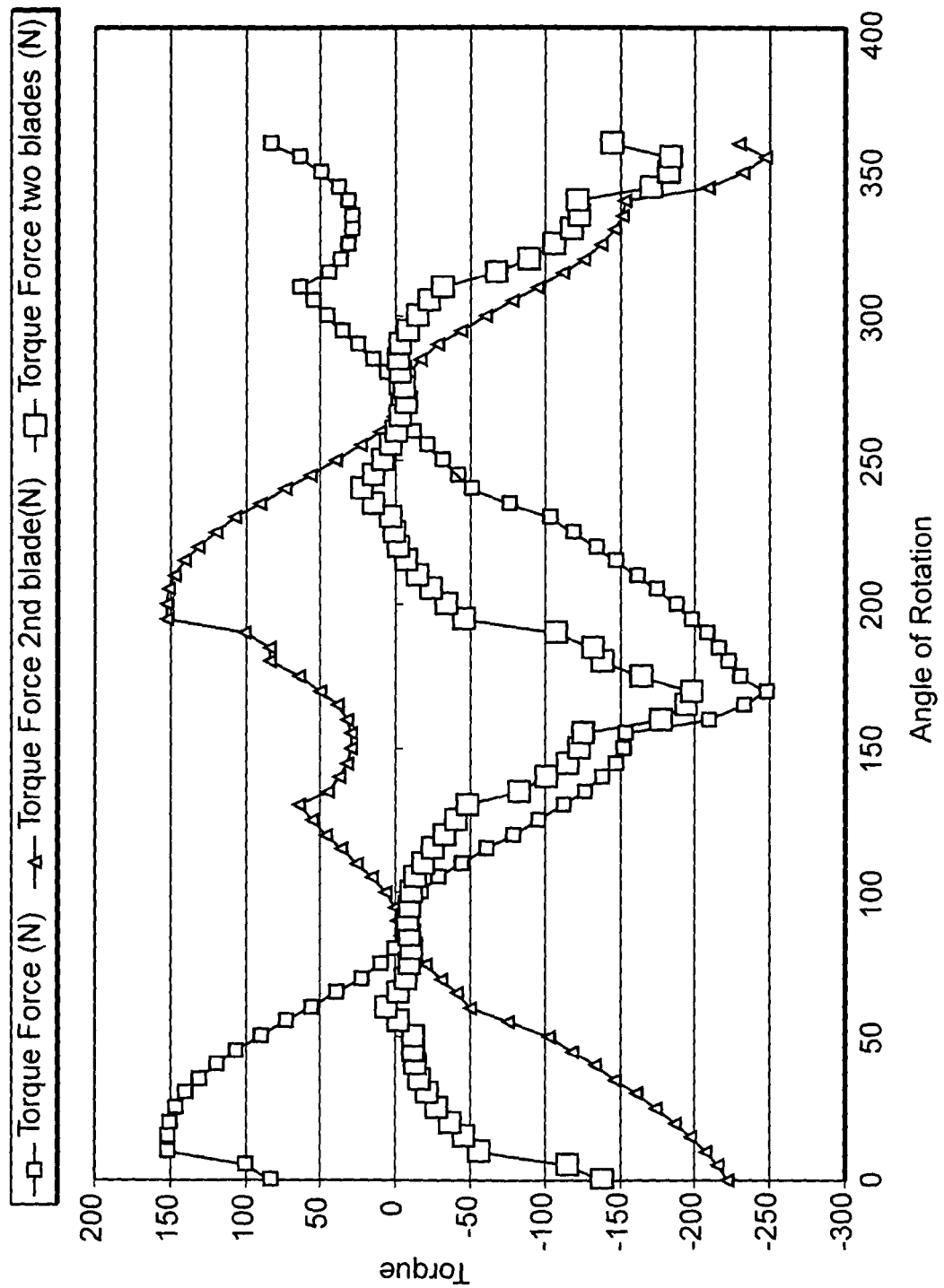
FIG. 18 depicts a plot of calculated torque force values for one embodiment of the turbine of the present invention.
Figure 19:
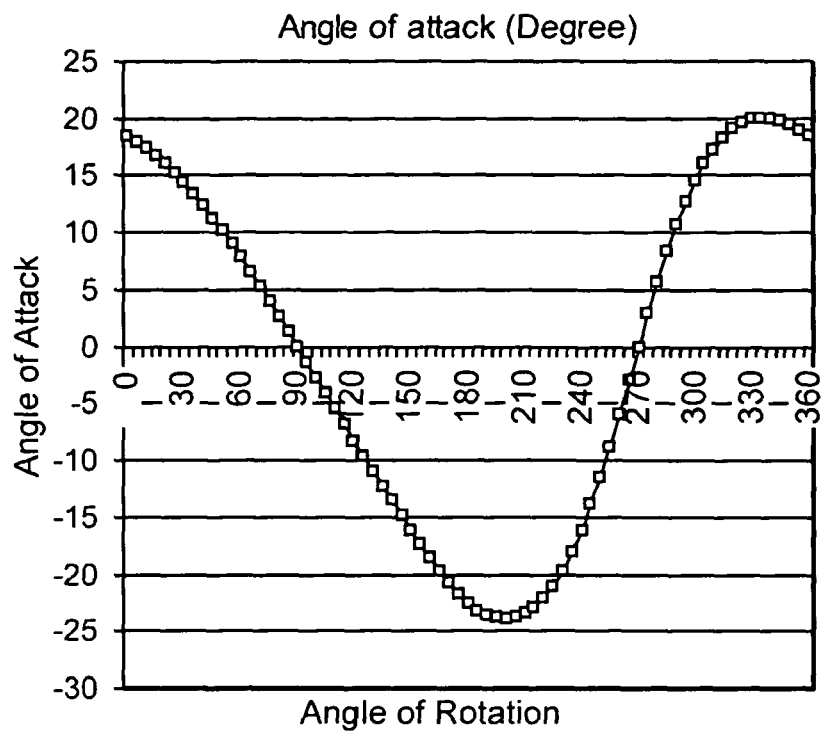
FIG. 19 depicts a plot of calculated angles of attack for one embodiment of the turbine of the present invention.
Figure 20:
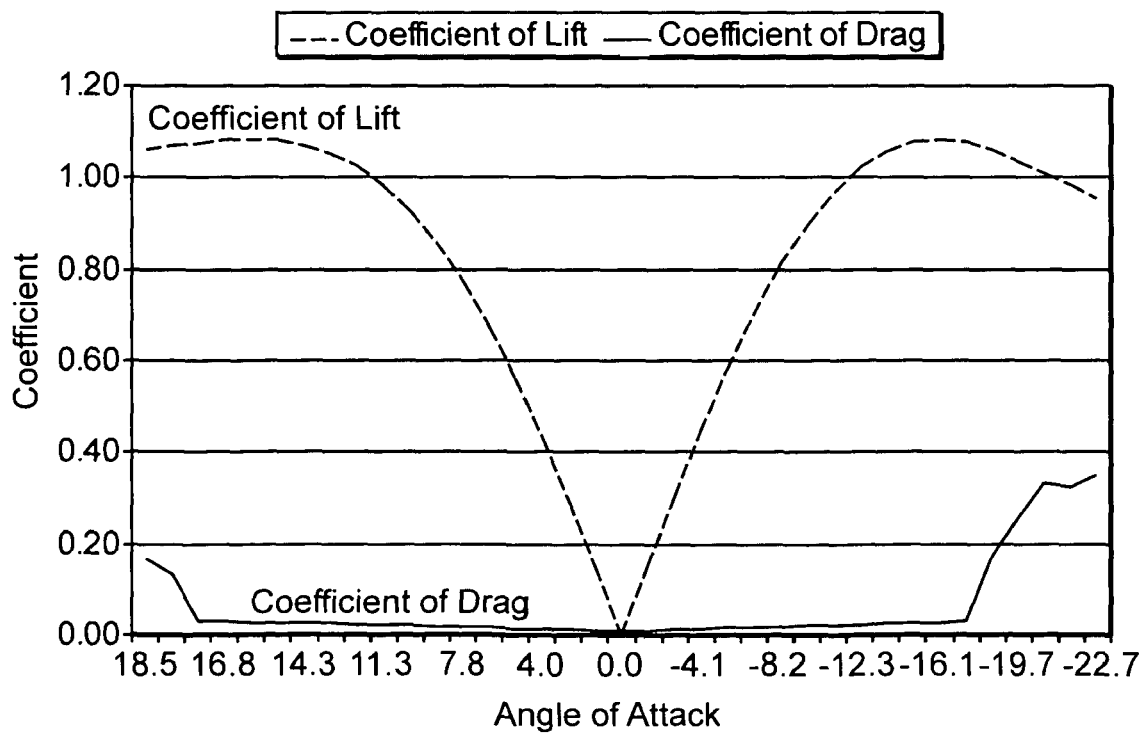
FIG. 20 calculated coefficients of lift and drag for one embodiment of the turbine of the present invention.

FIGS. 15 through 22 present other aspects of a performance analysis of the turbine 100 of the present invention. FIGS. 15 and 16 present a comparison of the turbine 100 of the present invention to a Gorlov Helical Turbine (GHT) capable of producing an identical power output of approximately 69.94 kW. In the embodiment of FIGS. 15 and 16, the turbine 100 of the present invention has an efficiency of 43.73% while the GHT is only 30% efficient. The diagram and equations of FIG. 17 demonstrate derivations of the calculated values of FIG. 15 and FIGS. 18 through 20. FIG. 18 presents calculated torque force values for the exemplary embodiment of the plurality of blades 105 having the dimensions listed in the table of FIG. 15. FIG. 19 presents calculated angles of attack 140 for the exemplary embodiment of the plurality of blades 105 having the dimensions listed in the table of FIG. 15, and FIG. 20 presents calculated coefficients of lift and drag for the exemplary embodiment of the plurality of blades having the dimensions listed in the table of FIG. 15. One skilled in the art will understand that efficiency and power output of the turbine 100 strongly depends on diameter and fluid velocity. Turbines with larger diameters can achieve high efficiency levels at higher water speeds.

In addition to providing highly efficient power generation, the barrel shaped design of the turbine 100 of the present invention also withstands high stresses, as the load analysis models of FIGS. 21 and 22 demonstrate. For an embodiment of the turbine 100 having the dimensions listed in the table of FIG. 15, maximum calculated displacement at 250 rpm is less than 2 millimeters. As FIG. 21 demonstrates, a maximum displacement of about 1.86 mm occurred in the middle of the "free" sections of the plurality of blades 105 (i.e. between the spokes). With regard to centrifugal loading stresses at a velocity of 250 rpm, as depicted in FIG. 22, an operational simulation of the turbine 100 showed some elevated stresses on the redial spokes 115 adjacent to the central shaft 110. The stresses reached a maximum value of approximately 80 MPa. Because the yield strength and ultimate strength of structural steel are on the order of 250 MPa and 400 Mpa respectively, steel radial spokes 115 will withstand centrifugal loading without any potential for failure.

Figure 23:
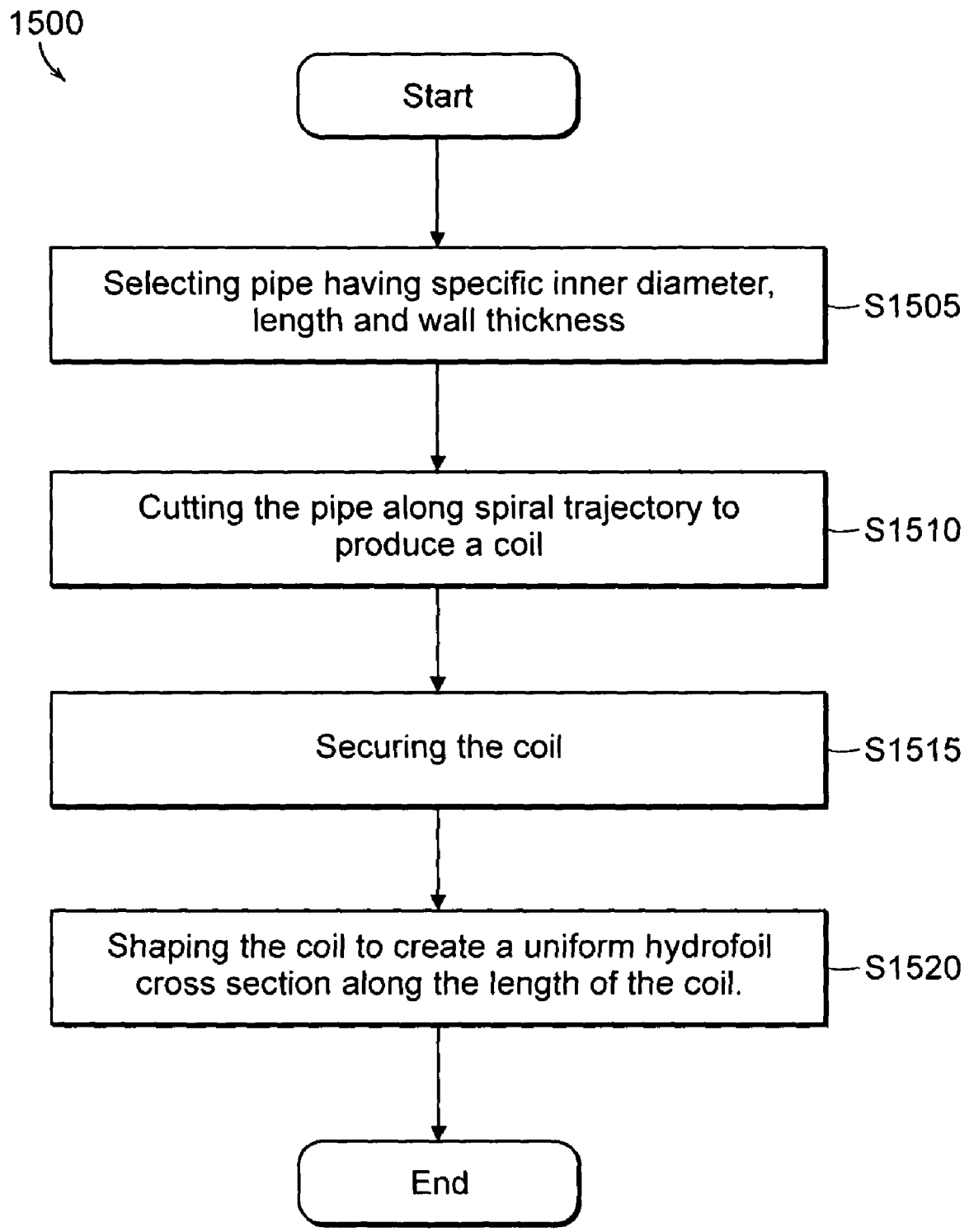
FIG. 23 is a flow diagram of one method of manufacturing an embodiment of the turbine of the present invention.

Turning now to FIG. 23, the present invention also comprises methods of manufacturing the turbine 100. The plurality of turbine blades 105 and radial spokes 115 are manufactured from any durable lightweight material such as a lightweight metal, composite fiber or plastic, and the turbine blades 105 and radial spokes 115 may be either hollow or solid. In one embodiment of the present invention, the plurality of blades 105 and radial spokes 115 are non-hollow members manufactured from a high strength plastic material chosen from a group consisting of but not limited to polyhydroxybutyrate plastic, polystyrene, polymethyl methacrylate, nylon, acrylic, low density polyethylene, high density polyethylene, polypropylene, polyvinyl chloride, silicone, and polyurethane. The plurality of blades 105 and radial spokes 115 may be formed through any number of known manufacturing methods, such as machining, extrusion or injection molding.

FIG. 23 details a preferred method of manufacture 1500 for the plurality of blades 105 according to one embodiment of the present invention. A first step S1505 comprises selecting a pipe having a specific inner diameter, length and sidewall thickness. The inner diameter dimension dictates the maximum radius of the plurality of blades 105 as they spiral around the central shaft 110. The length of the pipe similarly approximates the length of the plurality of blades 105, although assembly according to one method involves stretching and/or contracting portions of the coil or coils that form the plurality of blades 105. The sidewall thickness dictates a maximum thickness 235 of the hydrofoil cross-section 200 of the plurality of blades 105.

Next, a second step S1510 involves cutting the pipe along a spiral trajectory to produce a coil, or rough blank, for a blade 105. Cutting the pipe along this spiral trajectory may be automated using known means, such as CAD-driven CNC drilling or milling, or manual cutting may suffice. To produce a coil having a specific spiral trajectory, a template, such as wooden guide rails, may be affixed to the surface of the pipe such that a cutting implement, for example, a portable manual or power saw, cuts a precise path around the circumference of the pipe.

A third step S1515 requires securing the formed coil to a shaping fixture such that an industrial shaper may shape the coil at a fourth step S1520 to create a smooth, uniform hydrofoil cross-section along the length of the coil as the coil advances past the cutting surfaces of the shaper. The industrial shaper has a profiled cutting surface that defines a desired profile of the hydrofoil cross-section 200. In one embodiment of the method of the present invention, a unique shaper may shape each side of the coil to produce an asymmetrical hydrofoil cross section. Passing a coil through a single industrial shaper first with one side exposed to the cutting surface and then with a second, parallel side exposed to cutting surface will produce a hydrofoil having a uniform cross-section 200 as measured about a centerline chord 230.

Achieving the barrel shape described above with regard to the turbine 100 of the present invention requires adjusting the coil, extending or contracting certain sections, to fit properly along the length of a central shaft 110 and join to a plurality of radial spokes 115 having variable lengths. In an alternate embodiment, the shaping process may achieve the desired trajectory of the plurality of blades. In such an embodiment, the coil produced at the second step S1510 moves along a parabolic path relative to the shaper so that a hydrofoil cross section 200 at the center of the coil length is formed from a portion of the pipe closer an outside pipe wall than a hydrofoil cross section 200 taken at either end of the coil. In this alternative embodiment of the method of manufacturing a turbine blade 105 according to the present invention, the wall thickness of the pipe selected in the first step S1505 is great enough to accommodate the barrel shaped curvature of a blade 105.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

We claim:

1. A turbine comprising:
   a) a central shaft having a scalable length and being engaged coaxially with a generator;
   b) a plurality of blades that rotate in a single direction when exposed to fluid flow, wherein the plurality of blades are joined to the central shaft by a plurality of radial spokes disposed substantially perpendicular to the central shaft and at least at the center of the turbine such that the rotating plurality of blades causes the shaft to rotate, and wherein the plurality of blades further comprise:
      i.) an airfoil-shaped cross section having a non-zero angle of attack, which angle is defined by an intersection of the chord of the airfoil-shaped cross section and a tangential line abutting the same cross section and oriented in the direction of fluid flow;
      ii.) a spiral wound trajectory rotating around the central shaft and having a variable radius along the length of the central shaft such that a distance measured from the plurality of blades to the center shaft is greater at the center of the turbine than at either end, wherein the plurality of radial spokes affix the plurality of blades to the central shaft at the variable radius; and
   c) a removable shaft extension system supported by a bearing carrier and disposed between the central shaft and the generator engaged with the central shaft such that the generator is removable without requiring disassembly of the turbine.

2. The turbine of claim 1, wherein the central shaft accommodates one or more turbines and/or accommodates variation in the trajectory of the plurality of blades in a single turbine.

3. The turbine of claim 1, wherein the plurality of blades is at least two blades spiraling around the central shaft.

4. The turbine of claim 1, wherein the angle of attack varies along the length of the turbine.

5. The turbine of claim 1, wherein a projection of the trajectory of the plurality of blades is barrel shaped such that a radial distance between the plurality of blades and the central shaft is smaller at the ends of the turbine than at any point between the ends.

6. The turbine of claim 1, wherein the plurality of blades traverses one or more 360 degree turns about the central shaft.

7. The turbine of claim 1, wherein the non-zero angle of attack maximizes torque generated by the turbine and maximizes turbine efficiency in a range of 30 to 50 percent and more preferably at about 43%.

8. The turbine of claim 7, wherein torque generated peaks between approximately 50 and 200 turbine revolutions per minute in response to fluid flow velocities ranging between approximately 1.4 to 4.0 meters per second.

9. The turbine of claim 7, wherein torque generated at a flow of approximately 3 meters per second produces optimal torque peaking in a range of about 800 to 1200 N-m at revolutions per minute in a range of about 50 to 190 turbine revolutions per minute, and more preferably produces torque of about 1000 N-m at about 140 turbine revolutions per minute.

10. The turbine of claim 9, wherein power generated by the turbine at about 1000 N-m of torque and 140 turbine revolutions per minute is in a range of 14 kW to 18 kW, and more preferably is 16.6 kW.

11. The turbine of claim 1, wherein the spiral wound, variable radius trajectory of the plurality of blades reduces stress and strain under load conditions.

12. The turbine of claim 11, wherein fixing one end of the turbine while exposed to a centrifugal load at 250 RPM results in maximum displacement of the plurality of blades in a range of about 1 millimeters to 5 millimeters and more preferably at about 1.9 millimeters.

13. The turbine of claim 1 wherein the turbine operates while submerged in a fluid gas and/or fluid liquid.

14. The turbine of claim 1, wherein the plurality of blades is manufactured from a durable lightweight material.

15. The turbine of claim 14, wherein the durable, lightweight material is a high strength plastic material chosen from a group consisting of polyhydroxybutyrate plastic, polystyrene, polymethyl methacrylate, nylon, acrylic, low density polyethylene, high density polyethylene, polypropylene, polyvinyl chloride, silicone, and polyurethane.

16. The turbine of claim 14, wherein the plurality of blades is machined.

17. The turbine of claim 14, wherein the plurality of blades is extruded.

18. The turbine of claim 14, wherein the plurality of blades is injection molded.

19. A method for generating power comprising:
a) providing a central shaft having a scalable length and being adapted for engaging coaxially with a generator;
b) providing a plurality of blades of a turbine that rotate in a single direction when exposed to fluid flow, wherein the plurality of blades are joined to the central shaft by a plurality of radial spokes disposed substantially perpendicular to the central shaft and at least at the center of the turbine such that the rotating plurality of blades causes the shaft to rotate, and wherein the plurality of blades further comprise:
  i. an airfoil-shaped cross section having a non-zero angle of attack, which angle is defined by an intersection of the chord of the airfoil-shaped cross section and a tangential line abutting the same cross section and oriented in the direction of fluid flow;
  ii. a spiral wound trajectory rotating around the central shaft and having a variable radius along the length of the central shaft such that a distance measured from the plurality of blades to the central shaft is greater at the center of the turbine than at either end, wherein the plurality of radial spokes affix the plurality of blades to the central shaft at the variable radius;
c) providing a generator for engaging with a removable shaft extension system supported by a bearing carrier and disposed between the central shaft and the generator such that the generator is removable without requiring disassembly of the turbine;
d) attaching the generator, the removable shaft extension system, and the plurality of blades to the central shaft to create a turbine generator unit assembly; and
e) deploying the turbine generator unit within a fluid flow.

20. The method of claim 19 further comprising harnessing power from the generator via transmission lines extending between the turbine generator unit and a base power station.

21. The method of claim 19 wherein the central shaft accommodates one or more turbines and/or accommodates variation in the trajectory of the plurality of blades in a single turbine.

22. The method of claim 19 wherein the plurality of blades is at least two blades spiraling around the central shaft.

23. The method of claim 19 wherein the angle of attack varies along the length of the turbine.

24. The method of claim 19 wherein a projection of the trajectory of the plurality of blades is barrel shaped such that a radial distance between the plurality of blades and the central shaft is smaller at the ends of the turbine than at any point between the ends.

25. The method of claim 19 wherein the plurality of blades traverses one or more 360 degree turns about the central shaft.

26. The method of claim 19 wherein the non-zero angle of attack maximizes torque generated by the turbine and maximizes turbine efficiency preferably between 30 and 50 percent and more preferably at 43%.

27. The method of claim 26, wherein torque generated peaks between approximately 50 and 200 turbine revolutions per minute in response to fluid flow velocities ranging between approximately 1.4 to 4.0 meters per second.

28. The method of claim 26, wherein torque generated at a flow of approximately 3 meters per second produces optimal torque peaking in a range of about 800 to 1200 N-m at revolutions per minute in a range of about 50 to 190 turbine revolutions per minute, and more preferably produces torque of about 1000 N-m at about 140 turbine revolutions per minute.

29. The method of claim 28, wherein power generated by the turbine at about 1000 N-m of torque and 140 turbine revolutions per minute is in a range of 14 kW to 18 kW, and more preferably is 16.6 kW.

30. The method of claim 19, wherein the spiral wound, variable radius trajectory of the plurality of blades reduces stress and strain under load conditions.

31. The method of claim 30, wherein fixing one end of the turbine while exposed to a centrifugal load at 250 RPM results in maximum displacement of the plurality of blades in a range of about 1 millimeters to 5 millimeters and more preferably at about 1.9 millimeters.

32. The method of claim 19 wherein the turbine operates while submerged in a fluid gas and/or fluid liquid.

33. The method of claim 19, wherein the plurality of blades is manufactured from a durable lightweight material.

34. The method of claim 33, wherein the durable, lightweight material is a high strength plastic material chosen from a group consisting of polyhydroxybutyrate plastic, polystyrene, polymethyl methacrylate, nylon, acrylic, low density polyethylene, high density polyethylene, polypropylene, polyvinyl chloride, silicone, and polyurethane.

35. The method of claim 33, wherein the plurality of blades is machined.

36. The method of claim 33, wherein the plurality of blades is extruded.

37. The method of claim 33, wherein the plurality of blades is injection molded.

* * * * *